United States Patent
Huang et al.

(10) Patent No.: US 11,947,589 B2
(45) Date of Patent: Apr. 2, 2024

(54) WEB-SCALE PERSONALIZED VISUAL SEARCH RECOMMENDATION SERVICE

(71) Applicant: Microsoft Technology Licensing, LLC, Redmond, WA (US)

(72) Inventors: Li Huang, Sammamish, WA (US); Rui Xia, Burnaby (CA); Zhiting Chen, Bellevue, WA (US); Kun Wu, Bellevue, WA (US); Meenaz Merchant, Kirkland, WA (US); Kamal Ginotra, Kirkland, WA (US); Arun K. Sacheti, Sammamish, WA (US); Chu Wang, Bellevue, WA (US); Andrew Lawrence Stewart, Ottawa (CA); Hanmu Zuo, Toronto (CA); Saurajit Mukherjee, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/710,761

(22) Filed: Mar. 31, 2022

(65) Prior Publication Data
US 2023/0315781 A1   Oct. 5, 2023

(51) Int. Cl.
| | |
|---|---|
| *G06F 16/50* | (2019.01) |
| *G06F 16/532* | (2019.01) |
| *G06F 16/535* | (2019.01) |
| *G06F 16/56* | (2019.01) |

(52) U.S. Cl.
CPC ......... *G06F 16/535* (2019.01); *G06F 16/532* (2019.01); *G06F 16/56* (2019.01)

(58) Field of Classification Search
CPC ....... G06F 16/535; G06F 16/532; G06F 16/56
See application file for complete search history.

(56) References Cited

U.S. PATENT DOCUMENTS

| | | | |
|---|---|---|---|
| 8,280,881 B1 | 10/2012 | Zhou et al. | |
| 8,983,193 B1 * | 3/2015 | Ordonez Roman | ......................... G06V 10/7784 382/125 |
| 10,157,351 B1 * | 12/2018 | Rastogi | ................. G06F 16/957 |
| 11,163,779 B1 * | 11/2021 | Kulikov | ............ G06F 16/24575 |
| 11,354,349 B1 * | 6/2022 | Xu | ......................... G06F 16/532 |
| 2013/0083999 A1 | 4/2013 | Bhardwaj et al. | |
| 2021/0294835 A1 * | 9/2021 | Koroa | ................... G06F 16/538 |

OTHER PUBLICATIONS

"International Search Report Written Opinion Issued in PCT Patent Application No. PCT/US23/010849", dated Apr. 28, 2023, 11 Pages.

* cited by examiner

*Primary Examiner* — Kristopher Andersen

(57) ABSTRACT

Systems and methods directed to returning personalized image-based search results are described. In examples, a query including an image may be received, and a personalized item embedding may be generated based on the image and user profile information associated with a user. Further, a plurality of candidate images may be obtained based on the personalized item embedding. The candidate images may then be ranked according to a predicted level of user engagement for a user, and then diversified to ensure visual diversity among the ranked images. A portion of the diversified images may then be returned in response to an image-based search.

18 Claims, 19 Drawing Sheets

WEB-SCALE PERSONALIZED VISUAL SEARCH RECOMMENDATION SERVICE

BACKGROUND

Visual Search is a popular research area and is of great interest in the industry. Given an image, a visual search system can return a ranked list of visually similar images. Many research and industry products focus on retrieving visually similar sets of images that are based on the visual features contained in the user-provided input image. Some research and industry products return both visually and semantically similar results by leveraging text information, such as the surrounding text of image. Existing visual search systems, however, lack diversity by showing results that are similar to one another. Further, the existing visual search systems do not consider user intent when providing such similar results. For example, existing visual search systems generate a same set of image results for the same image regardless of the user performing the search or an intent of the user performing the search. Accordingly, a personalized visual search system is needed for providing images to users in a more personalized manner.

It is with respect to these and other general considerations that the aspects disclosed herein have been described. Also, although relatively specific problems may be discussed, it should be understood that the examples should not be limited to solving the specific problems identified in the background or elsewhere in this disclosure.

SUMMARY

In accordance with at least one example of the present disclosure, systems and methods for returning personalized image-based search results are described. In examples, a method may include: receiving a query including an image, generating a personalized item embedding based on the image and user profile information associated with a user, obtaining a plurality of candidate images based on the personalized item embedding, ranking the plurality of candidate images according to a predicted level of user engagement for the user, diversifying the ranked plurality of candidate images and obtaining a final set of candidate images and returning a portion of the final set of candidate images.

In accordance with at least one example of the present disclosure, systems and methods for returning personalized image-based search results are described. In examples, a method may include: receiving, as a first request, a first query including an image, generating a first personalized item embedding based on the image and user profile information associated with the first request, obtaining a first plurality of candidate images based on the first personalized item embedding, returning a portion of the first plurality of candidate images to a computing device associated with the first request, receiving, as a second request, a second query including the same image, generating a second personalized item embedding based on the same image and user profile information associated with the second request, obtaining a second plurality of candidate images based on the second personalized item embedding and returning a portion of the second plurality of candidate images to a computing device associated with the second request.

In accordance with at least one example of the present disclosure, systems and methods for ranking images in an image set based on a predicted level of user engagement are described. In examples, a method may include receiving a set of candidate images, for each image in the set of candidate images, predicting a user engagement score indicating a likelihood a user will click the respective image in the set of candidate images and storing an engagement-based ranked set of candidate images based on the engagement score predicted for each respective image.

In accordance with at least one example of the present disclosure, systems and methods for ranking images in an image set based on a visual diversity of each image with respect to other images in the image set are described. In examples, a method may include receiving a set of candidate images, generating a distance score as a measure of dissimilarity for each image in the set of candidate images, selecting a subset of images from the set of candidate images based on a distance score of each image and storing, as a diversity ranked set of candidate images, the subset of images.

In accordance with at least one example of the present disclosure, systems and methods for generating data for optimizing an item embedding generation process and generating an item embedding based on the data are described. In examples, a method may include receiving a plurality of user logs indicating items selected in response to one or more queries, for each query of the one or more queries, grouping the items selected based on a session duration, generating item-item pairs from the selected items that being grouped within the same session, populating an item interaction matrix based on the generated item-item pairs and generating an item embedding for a received item based on the interaction matrix.

In accordance with at least one example of the present disclosure, systems and methods for obtaining training data for training a machine learning model to generate a user embedding for a user are described. In examples, a method may include identifying the item of the one or more items as a query item, identifying one or more items occurring before the query item as historical items, and identifying an item occurring after the query item as a ground-truth next click item, generating a list of contexts specific to the user associated with the user log and training a user specific machine learning model using the list of contexts.

In accordance with at least one example of the present disclosure, systems and methods for generating a user embedding for a user are described. In examples, a method may include receiving recent search history for the user and generating a user embedding for the user based on the received recent search history, wherein the user embedding is generated using a user specific machine learning model trained with training data specific to the user, wherein the training data includes a list of contexts obtained from a user log indicating items selected by the user in response to one or more queries.

Any of the one or more above aspects in combination with any other of the one or more aspects. Any of the one or more aspects as described herein.

This Summary is provided to introduce a selection of concepts in a simplified form, which is further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the following description and, in part, will be apparent from the description, or may be learned by practice of the disclosure.

BRIEF DESCRIPTION OF THE DRAWINGS

Non-limiting and non-exhaustive examples are described with reference to the following Figures.

DETAILED DESCRIPTION

In the following detailed description, references are made to the accompanying drawings that form a part hereof, and in which are shown by way of illustrations specific aspects or examples. These aspects may be combined, other aspects may be utilized, and structural changes may be made without departing from the present disclosure. Aspects may be practiced as methods, systems or devices. Accordingly, aspects may take the form of a hardware implementation, an entirely software implementation, or an implementation combining software and hardware aspects. The following detailed description is therefore not to be taken in a limiting sense, and the scope of the present disclosure is defined by the appended claims and their equivalents.

Figure 1A:
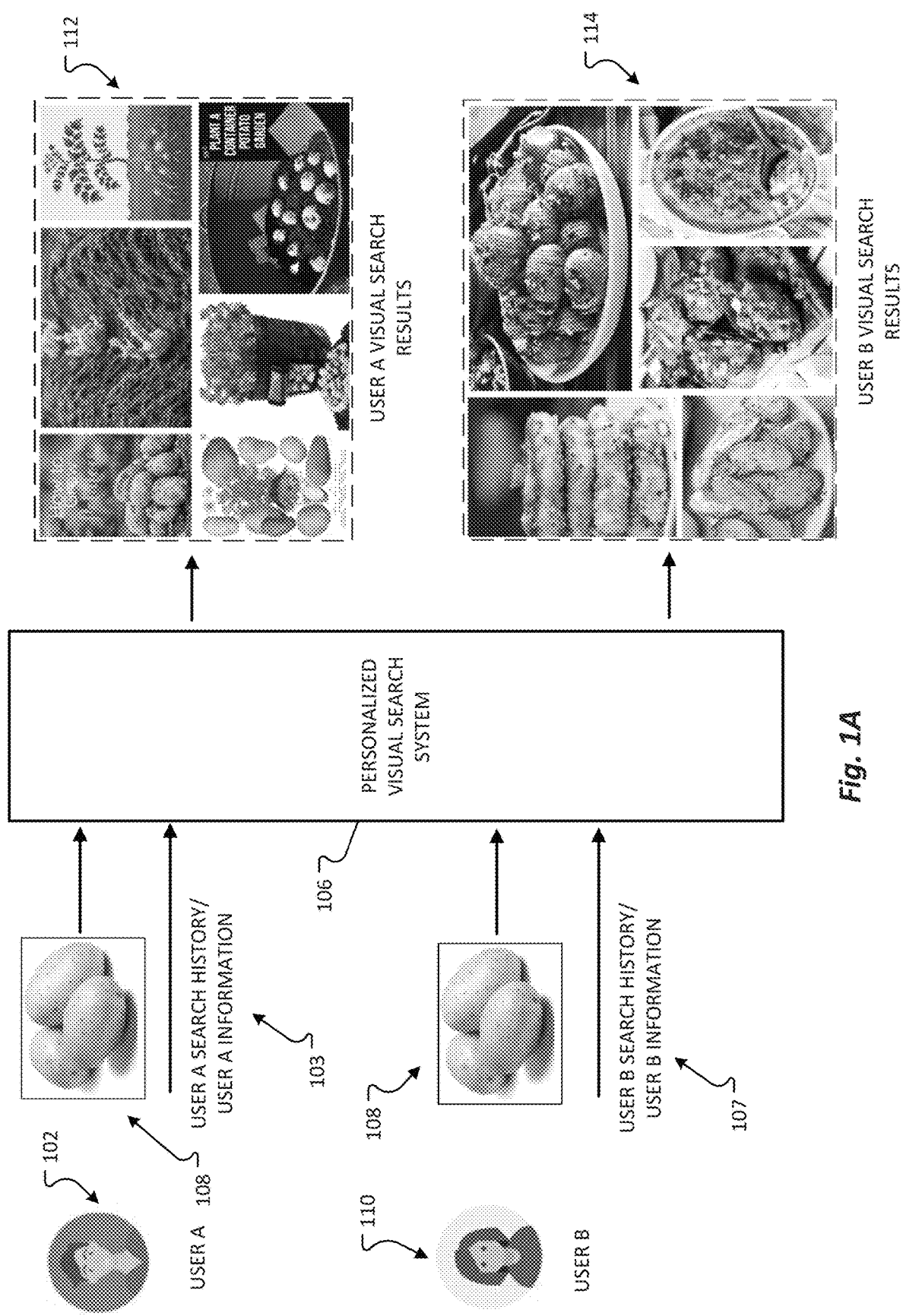
FIG. 1A depicts details of a web-scale personalized visual search system in accordance with examples of the present disclosure.

FIG. 1A depicts an example of a web-scale personalized visual search system 100 in accordance with examples of the present disclosure. The web-scale personalized visual search system 100 assists a user in discovering, exploring, and/or engaging with visual search recommendation results, such as images, in real-time. Using user input, including but not limited to a query image, search history, and user information from a user profile for example, the web-scale personalized visual search system 100 may provide different search results to different users based on a same query image that is provided to the web-scale personalized visual search system 100. For example, a user A 102 may provide an image 108 as a query image to the personalized visual search system 106; the personalized visual search system 106 may then return a personalized set of resulting images 112 to the user A 102.

In accordance with examples of the present disclosure, user search history and user information 103 may be obtained from a computing device associated with a user, and provided to the personalized visual search system 106. Together with the query image 108, the personalized visual search system 106 may return a personalized set of resulting images 112 specific to the user A 102. For example, user A 102 may be a gardening enthusiast and may enjoy or otherwise have experience in gardening. The personalized set of resulting images 112 provided by the personalized visual search system 106 for a gardening enthusiast may be different from a personalized set of resulting images 114 for a chef or food enthusiast. That is, user B 110 may be a chef or food enthusiast and may provide the same image 108 to be used as a query image by the personalized visual search system 106. In addition to the query image 108, user search history and user information 107 specific to user B 110 may influence the personalized set of resulting images 114 returned by the personalized visual search system 106 to user B 110. As depicted in FIG. 1A, the personalized set of resulting images 112 for user A 102 that are provided by the personalized visual search system 106 are different from the personalized set of resulting images 114 for user B 110 provided by the same personalized visual search system 106 and for a same query image 108. That is, the personalized visual search system 106 may return gardening related images, for example, in the personalized set of resulting images 112 based on the user search history and user information 103 for user A 102, and food or cuisine related images in the personalized set of resulting images 114 based on the user search history and user information 107 for user B 110.

Figure 1B:
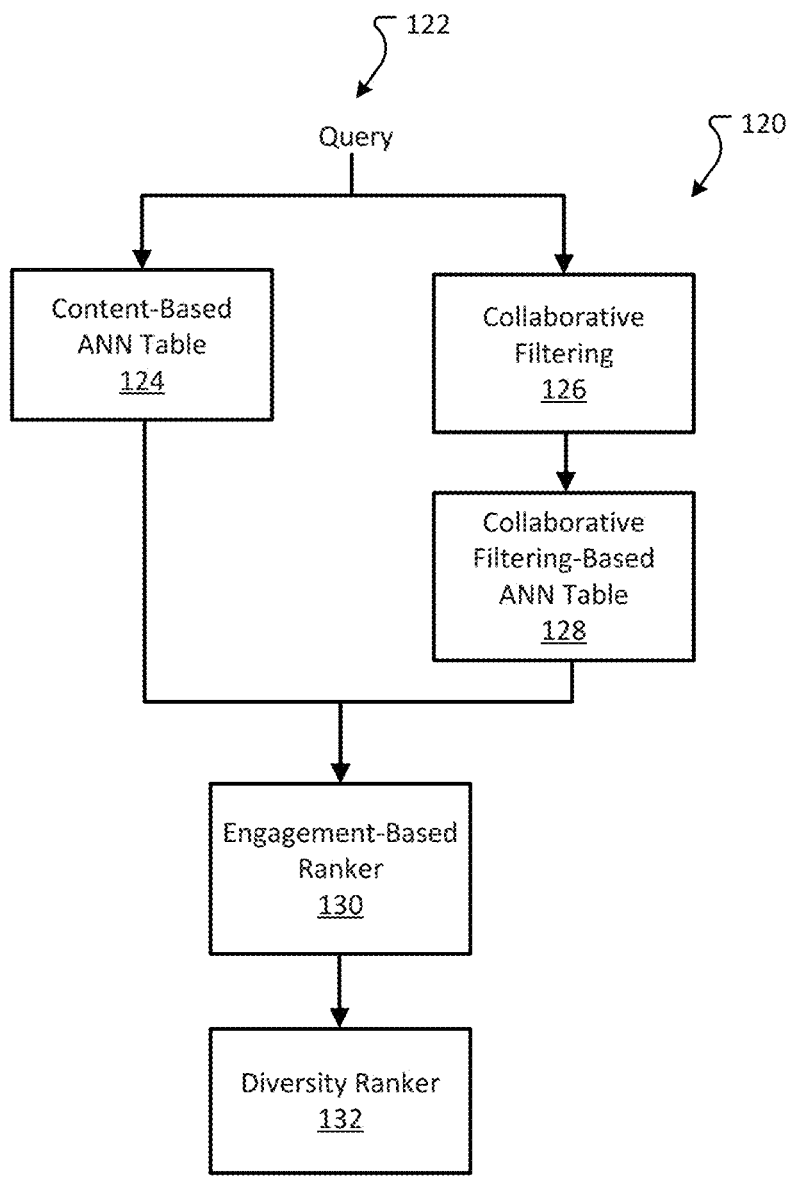
FIG. 1B depicts additional details of a web-scale personalized visual search system in accordance with examples of the present disclosure.

FIG. 1B depicts additional details of a web-scale personalized visual search system 120 in accordance with examples of the present disclosure. The web-scale personalized visual search system 120 may be the same as or similar to the web-scale personalized visual search system 106 of FIG. 1A. The web-scale personalized visual search system 120 may receive a query 122 from a user, where the query 122 includes an image. Base on the query 122, candidate results are obtained via index selection using an Approximated Nearest Neighbor (ANN) search. The candidate results may then be merged and reranked by an engagement-based ranker 130. The top candidate results provided by the engagement-based ranker 130 are then reranked by a diversity ranker 132. The reranked candidate results may then be provided to a user as a set of resulting images.

To perform index selection, two ANN tables may be utilized. A content-based ANN table 124 may be used to provide visually and semantically related image results and further serve as a basis, or fallback route, when a collaborative filter-based ANN search is not available. The collaborative filter-based ANN search table 128 may provide personalized candidate results by leveraging a personalized item embedding as a query vector. For example, when a query image is received from a specified user, the collaborative filter-based ANN table 128 may be searched using an element-wise product of a query item embedding and a user embedding. In examples, the content-based ANN table 124 may resolve the cold start problem when new items do not yet exist in the collaborative filter-based ANN table 128 (or index). The element-wise product of the query item embedding and the user embedding may be provided to the engagement-based ranker 130. Alternatively, or in addition, image embeddings (e.g., image embeddings that may be visually similar to the input image) obtained from the content-based ANN table 124 may be provided to the engagement-based ranker 130 when the collaborative filtering-based ANN search table 128 is not utilized.

The engagement-based ranker 130 may be a transformer-based neural network model trained on user click logs, where a user click log may indicate a measure of user engagement with one or more images selected, or clicked, by the user within a specified amount of time. Thus, a candidate set of images, or image embeddings, provided as a result of searching the content-based ANN table 124 and/or the collaborative filtering-based ANN table 128, may be provided to the engagement-based ranker 130, where the engagement-based ranker 130 may rank the received candidate images based on a predicted level, or measure, of user engagement. For example, the engagement-based ranker 130 may ranking an image predicted to have a high level of user engagement higher than an image predicted to have a low level of user engagement. In examples, the engagement-based ranker 130 may also base rankings on user attributes, such as location, age, gender. Further, the engagement-based ranker 130 may also include content-based features, such as Deep Neural Network (DNN) embeddings, dominant colors, dominant objects, etc. The engagement-based ranker 130 ranker can then provide a ranked set of candidate images, or image embeddings, to a diversity ranker 132, where the ranked set of candidate images, or image embeddings, are ranked according to how likely each is to create or generate user interaction.

In examples, the ranked set of candidate images, or image embeddings, may be processed by the diversity ranker 132, which may maximize a distance between each of candidate images in the ranked set of candidate images based on a given feature vector. The content-based features may be used for the purpose of maximizing visual diversity such that the candidate images resulting from the diversity ranker 132 may be sufficiently different from one another. In examples, the diversity ranker 132 may utilize a determinantal point process (DPP) algorithm to maximize the distance (e.g., visual differences in the images) between results. Results from the diversity ranker 132 may be provided to a user or computing device as being personalized search results that are specific to a specific user.

In examples, the diversity-based ranker 132 may rank images, or image embeddings from one or more sources. For example, image embeddings obtained from the collaborative filtering-based ANN table 128 may be provided to the diversity ranker 132. In some examples, image embeddings obtained from the content-based ANN table 124 may be provided to the diversity ranker 132. Alternatively, or in addition, and as previously discussed, the diversity ranker 132 may receive ranked candidate images, or ranked candidate image embeddings, from the engagement-based ranker 130.

Figure 2:
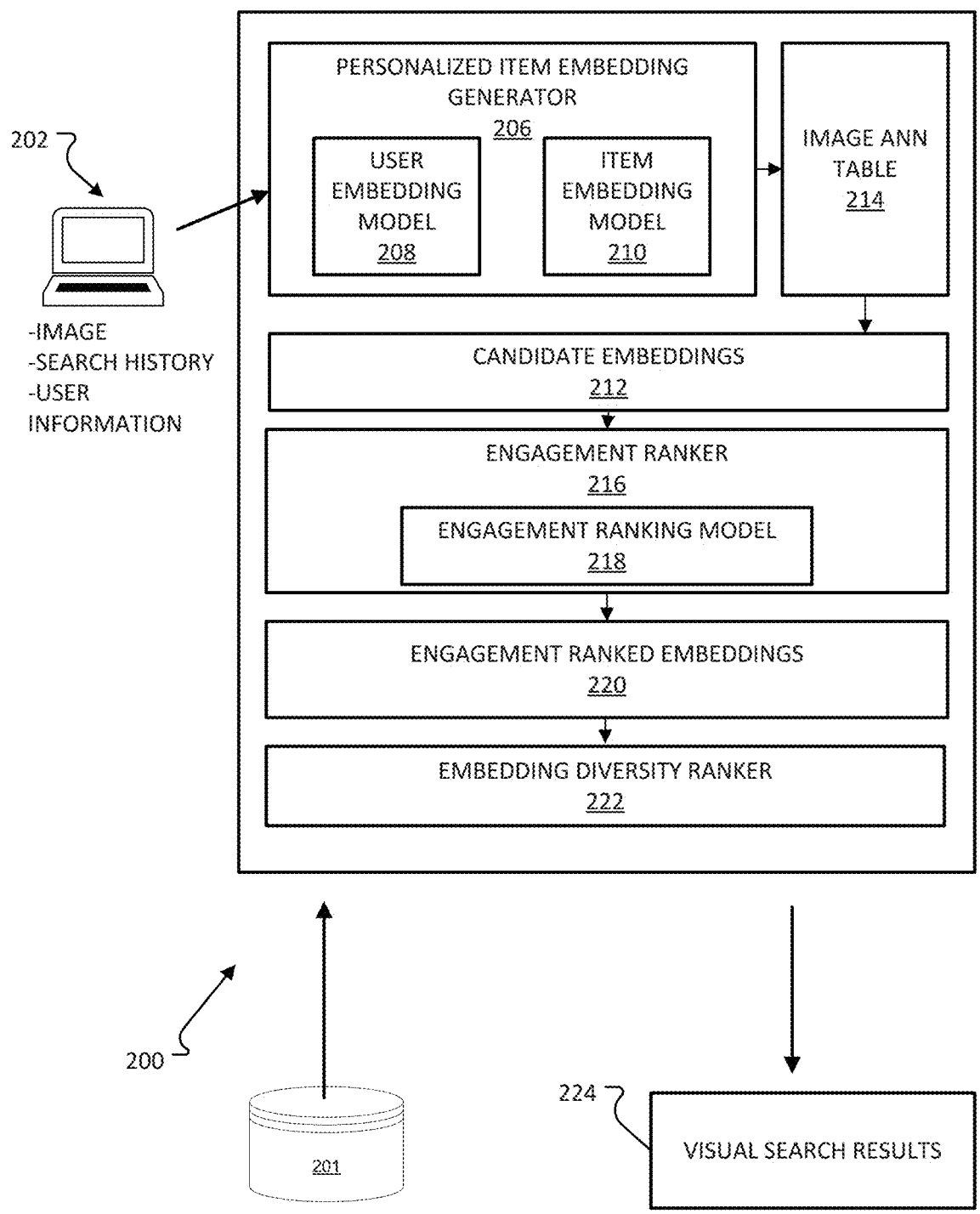
FIG. 2 depicts a first example of a web-scale personalized visual search system in accordance with examples of the present disclosure.

FIG. 2 depicts additional details of a web-scale personalized visual search system 200 in accordance with examples of the present disclosure. The web-scale personalized visual search system 200 may be the same as or similar to the web-scale personalized visual search system 120 as previously disclosed. In examples, the web-scale personalized visual search system 200 may include a personalized embedding generator 206, which may receive content or information from a computing device, such as computing device 202. The content or information received from the computing device 202 may include, but is not limited to, a query image, user search history, and other user information. In examples, the user search history may include image, or text, searches performed by a user and may further include image interaction information, such as but not limited to image selection made by a user at a given point in time during one or more sessions. Similarly, the user information may include, but is not limited to, location, age, gender, or other information content that may be determined from a user identifier, user profile information, or otherwise. In examples, the user embedding model 208, may generate a user embedding, or vector, indicative of the search history and user information provided by the mobile computing device 202.

The personalized embedding generator 206 may further include an item embedding model 210 utilized to generate an item embedding based on the image received as part of the visual search query. The personalized item embedding generator 206 may then generate a personalized item embedding based on the generated user embedding and item embedding. The personalized item embedding may then be utilized to select candidate images, or candidate embeddings) from an image ANN table 214, where the image ANN table 214 may include a content-based ANN table (such as content-based ANN table 124) and/or a collaborative filtering-based ANN table (such as the collaborative filter-based ANN table 128). In examples, the image ANN table 214 may be based on a plurality of images acquired from a network and/or the internet. For example, a repository of images 201 may provide a basis for generating the ANN table 214. Candidate embeddings 212 (e.g., candidate image embeddings) obtained via index selecting using the personalized item embedding and the image ANN table 214, may be obtained. The candidate embeddings 212 may then be provided to the engagement ranker 216, which may be the same as or similar to the engagement-based ranker 130 as previously discussed.

The engagement ranker 216 may include a transformer-based neural network model 218 trained on user click logs, where a user click log may indicate a measure of user engagement with one or more images selected, or clicked, by the user within a specified amount of time. Thus, the engagement ranker 216 may rank the received candidate embeddings 212 based on a predicted level, or measure, of user engagement. In examples, the input to the engagement ranker 216 may also include user attribute information, such as but not limited to user location, user age, user gender, etc. Such user attribute information may be provided from the user information obtained as previously described. In examples, the engagement ranker 216 may also include content-based features, such as Deep Neural Network (DNN) embeddings, dominant colors, dominant objects, etc. The engagement ranker 216 can then provide engagement ranked embeddings 220 to the embedding diversity ranker 222, which may be the same as or similar to the diversity ranker 132 as previously described. The embedding diversity ranker 222 may provide a set of visual search results 224 to a user or computing device, where the set of visual search results 224, also referred to as a set of candidate images or set of candidate image embeddings, have been ranked according to how likely each is to create user interaction, or user engagement, and are diverse from one another.

Figure 3A:
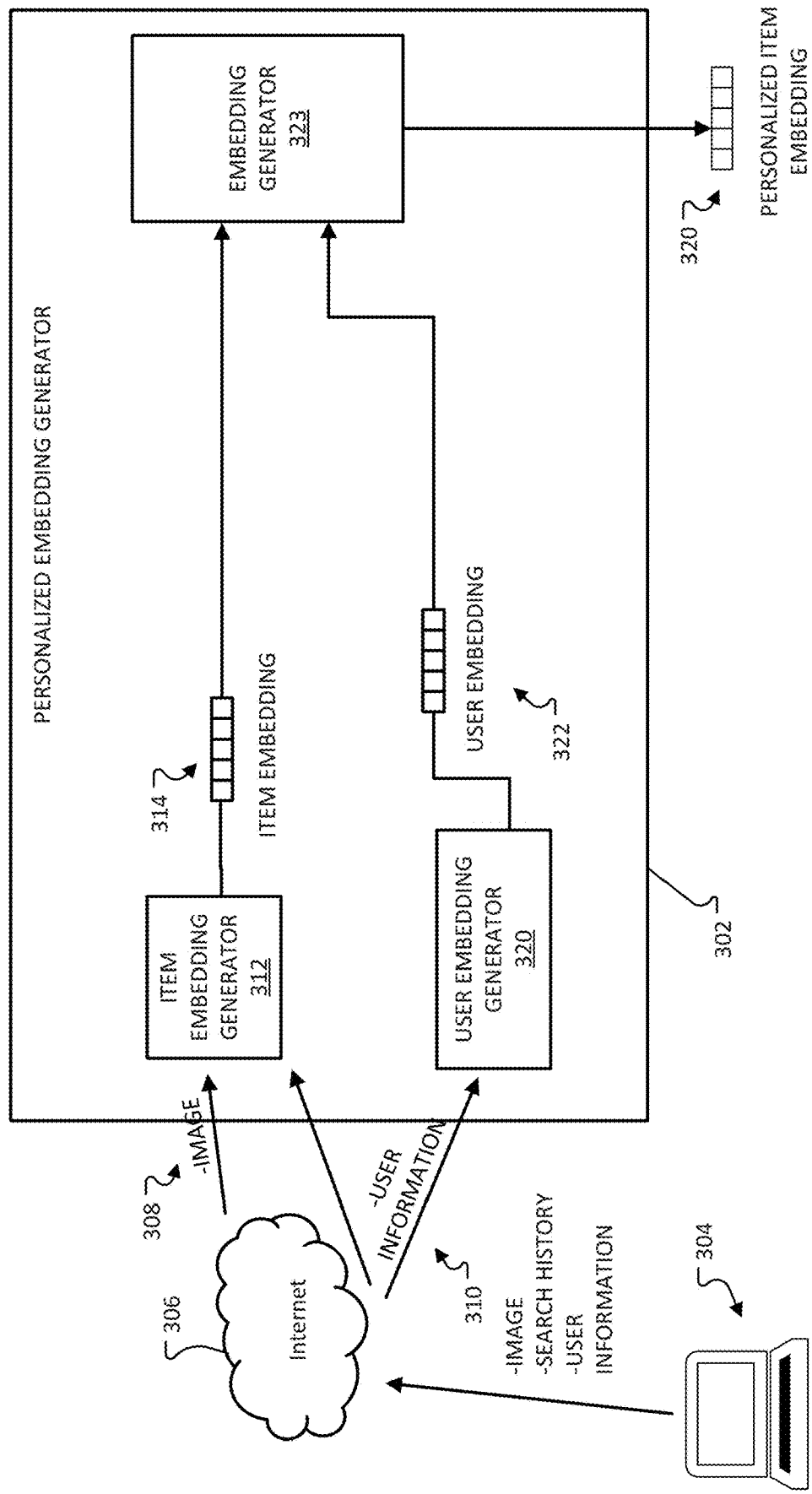
FIG. 3A depicts additional details directed to generating a personalized item embedding via a personalized embedding generator in accordance with examples of the present disclosure.

FIG. 3A depicts additional details directed to generating a personalized item embedding 320 via a personalized embedding generator 302 in accordance with examples of the present disclosure. The personalized embedding generator 302 may be the same as or similar to the personalized item embedding generator 206 as previously described. In examples, the computing device 304, which may be the same as or similar to the computing device 202, may provide a user selected query, including an image 308, to the personalized embedding generator 302, via a network, such as the internet 306. In addition, user information 310, including but not limited to user search history and/or other user information, may be provided to the personalized embedding generator 302 for use by the user embedding generator 320. The item embedding generator 312 may generate an item embedding 314 indicative of the query item image 308. In some examples, the item embedding generator 312 may generate an item embedding 314 according to one or more item embedding dictionaries based on item-item interactions, as will be discussed below. The item embedding 314 may be provided to the embedding generator 344. Similarly, the item embedding generator 312 may generate item embeddings for images found in a search history of a user, where such item embeddings may be considered by the embedding generator 344.

The user embedding generator 320 may generate a user embedding 322 based on the user information and/or user search history associated with the user. In examples, the user information may include user meta data including, but not limited to, user age, demographic, gender, and/or location information. The user embedding generator 320 may generate a user embedding 322 configured to "personalize" the item embedding. In examples, the user embedding generator 320 may utilize an attention-user item model to predict a next click, or selected image, of a user based on a click history derived from the search history of the user. The user embedding 322 can therefore amplify the item embedding 314 obtained from the item embedding generator 312. In examples, the user embedding generator 320 may combine a user embedding obtained from a from a dictionary (e.g., a trained model to predict the next click, or image selection of a user) with user metadata. Thus, the user embedding 322 can be treated as an attention for the item embedding 314 so that a subspace of the item embedding 314 which the user is interested in can be focused on or otherwise identified. The embedding generator 323 may then perform an element-wise product between the query item embedding 314 and the user embedding 322 to form the personalized item embedding 320.

Figure 3B:
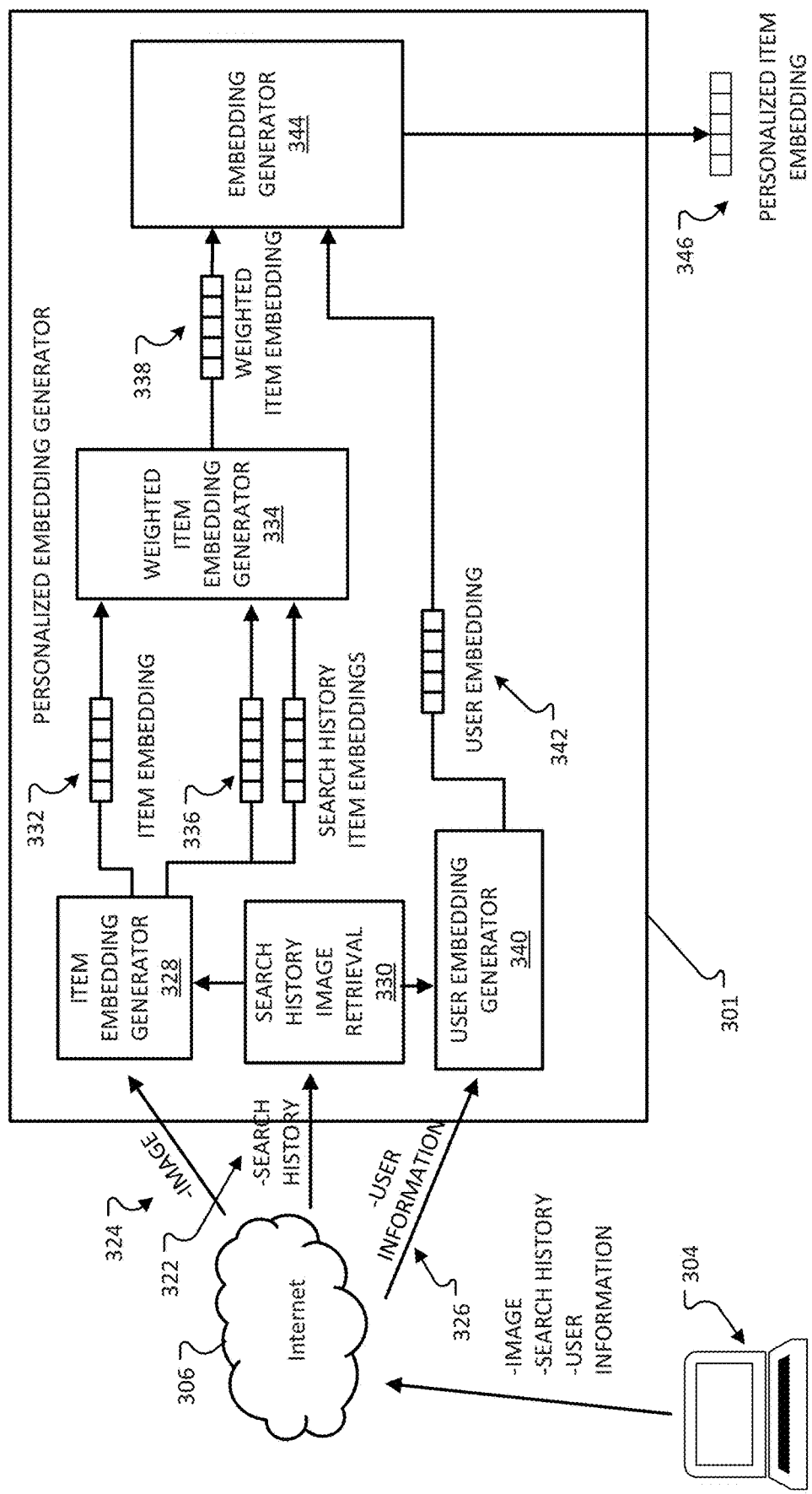
FIG. 3B depicts details of another example directed to generating a personalized item embedding via a personalized embedding generator in accordance with examples of the present disclosure.

FIG. 3B depicts additional details directed to generating a personalized item embedding 346 via a personalized embedding generator 301 in accordance with examples of the present disclosure. The personalized embedding generator 301 may be the same as or similar to the personalized item embedding generator 206 as previously described. In examples, the computing device 304, which may be the same as or similar to the computing device 202, may provide a user selected query including an image 324 to the personalized embedding generator 301, via a network, such as the internet 306. In addition, user information 326, including but not limited to user search history and/or other user information, may be provided to the personalized embedding generator 301 for use by the item embedding generator 328, search history image retrieval service 330, and the user embedding generator 340. The item embedding generator 328 may generate an item embedding 332 indicative of the query item image 324. In some examples, the item embedding generator 328 may generate an item embedding 332 according to one or more item embedding dictionaries based on item-item interactions. That is, an item embedding 332 may be a vector representation of items, or images, constructed from item-item interactions. For example, items, or images, that have similar patterns of interaction would most likely have similar item embeddings. Accordingly, item embeddings may be optimized using an item-based content filtering (CF) algorithm.

In examples, the item-based CF algorithm may consume a matrix, or other data structure, that describes all item-item interactions obtained from item-item training data. Accordingly, item embeddings can be modified to make them align with the item-item interaction information obtained from the data structure or matrix. The optimization process may utilize a sparse-efficient implementation of Bayesian Personalized Ranking algorithm, due in part, to the amount of information that may be included (e.g., image from the world wide web, internet, or other information service). The item-item embeddings can be assumed to exist within a Euclidean space such that a nearest neighbor operation can be performed. In examples, the item embedding 332 may be provided to the weighted item embedding generator 334.

In examples, the weighted item embedding generator 334 may utilize the query item embedding 332 to generate a weighted-average item embedding 338 based on past clicked item embeddings. For example, a search history 322 may be obtained from a computing device 304, (e.g., a search history associated with a user profile of a user). Search history 322 may be provided to the search history image retrieval service 330 which may obtain items or otherwise identify items clicked or selected by the user. That is, the search history 322 may include clicks of items, such as images, which can be used to balance a current query (e.g., based on the image 324) and the past queries. Thus, the item embedding generator 328 may generate search history item embeddings 336 and provide the search history item embeddings 336 to the weighted item embedding generator 334. Thus, the weighted item embedding generator 334 may utilize the query item embedding 332, and the search history item embeddings 336 to generate a weighted-average item embedding 338. Thus, item information is obtained not only for the current item or image that a user is basing a query on, but also for clicked or selected items specific to the user search history. In examples, the weighting of the item embedding 332 to the search history item embedding 336 may be optimized utilizing an optimization model. For example, a weighting for a search history item embedding 336 may be based on a plurality of different user sessions.

In some examples, the weighting for a search history item embedding 336 may be static, dynamic, and/or may be obtained during a training process.

The user embedding generator 340 may generate a user embedding 342 based on the user information and/or search history associated with the user. In examples, the user information may include user meta data including, but not limited to, user age, demographic, gender, and/or location information. The user embedding generator 340 may generate a user embedding 342 configured to "personalize" the weighted item embedding 338. In examples, the user embedding generator 340 may utilize an attention-user item model to predict a next click, or selected image, of a user based on a click history derived from the search history of the user. The user embedding 342 can therefore amplify the weighted item embedding 338 obtained from the weighted item embedding generator 334. In examples, the user embedding generator 340 may combine a user embedding obtained from a dictionary (e.g., a trained model to predict the next click, or image selection of a user), and then combined with user metadata. Thus, the user embedding 342 can be treated as an attention for the weighted item embedding 338 so that a subspace of the item embedding 332 which the user is interested in can be focused on or otherwise identified. The embedding generator 344 may then perform an element-wise product between the weighted item embedding 338 and the user embedding 342 to form the personalized item embedding 346.

To generate high quality user and item embeddings, two training data generation processes maybe performed. In examples, an item-item interaction matrix may be generated to hold or otherwise store indications of item pairs to be used in an item embedding optimization process. After the item embeddings have been obtained, user embeddings may be generated from a combination of recently interacted items (e.g., images) and other information, such as but not limited to location, language, or other user attributes. Additional details directed to obtaining item training data in accordance with examples of the present disclosure are described with respect to FIG. 4. To obtain item-item interaction pairs needed to optimize or otherwise train an item embedding model, the item-item matrix 450 may be generated for positive user interactions occurring across user sessions. For example, one or more user sessions for a user may be defined as a period of time (e.g., seconds, minutes, hours, e.g.) during which a user may search using one or more search queries. That is, a first user 404A may initiate a first query 408, where items clicked by the first user 404A, based on query results obtained from the query 408, may include items 412, 416, and 418. Two items may be considered to be an item-item pair if the items are clicked, or otherwise selected, within the same session by the user. Continuing with the example of FIG. 4, a session 422 may correspond to a period of time and/or a query 408. If the user 404A were to click or select item A 412, item B 416, and item C 418, then item-item pairs of (A, B), (A, C), and (B, C) can be generated from the first user 404A, as each of the item A 412, item B 416, and item C 418 were selected within the session 422. However, a pair (C, D) (e.g., item C 418 and item D 428) may not be considered to be an item-item pair as item D 428 is not considered to be within the same session 422 as item C 418. A length of the session 422 may vary, where a longer timespan may contain multiple queries, which can increase diversity of the results while decreasing similarity, since user queries are likely to be less similar as an amount of time increases between such queries. Moreover, item-item pairs may be aggregated across all users (e.g., first user 404A, second user 404B, and third user 404C) in a specific date range. For item-item pairs that are identified to occur in multiple sessions, the indication of repeated item pairs may be used as a weighting, where some item-item pairs may be considered to be noisy based on the weighting. Thus, reliable item-item pairs can be obtained from search history or click logs of users using multiple user sessions as described with respect to FIG. 4.

Figure 4:
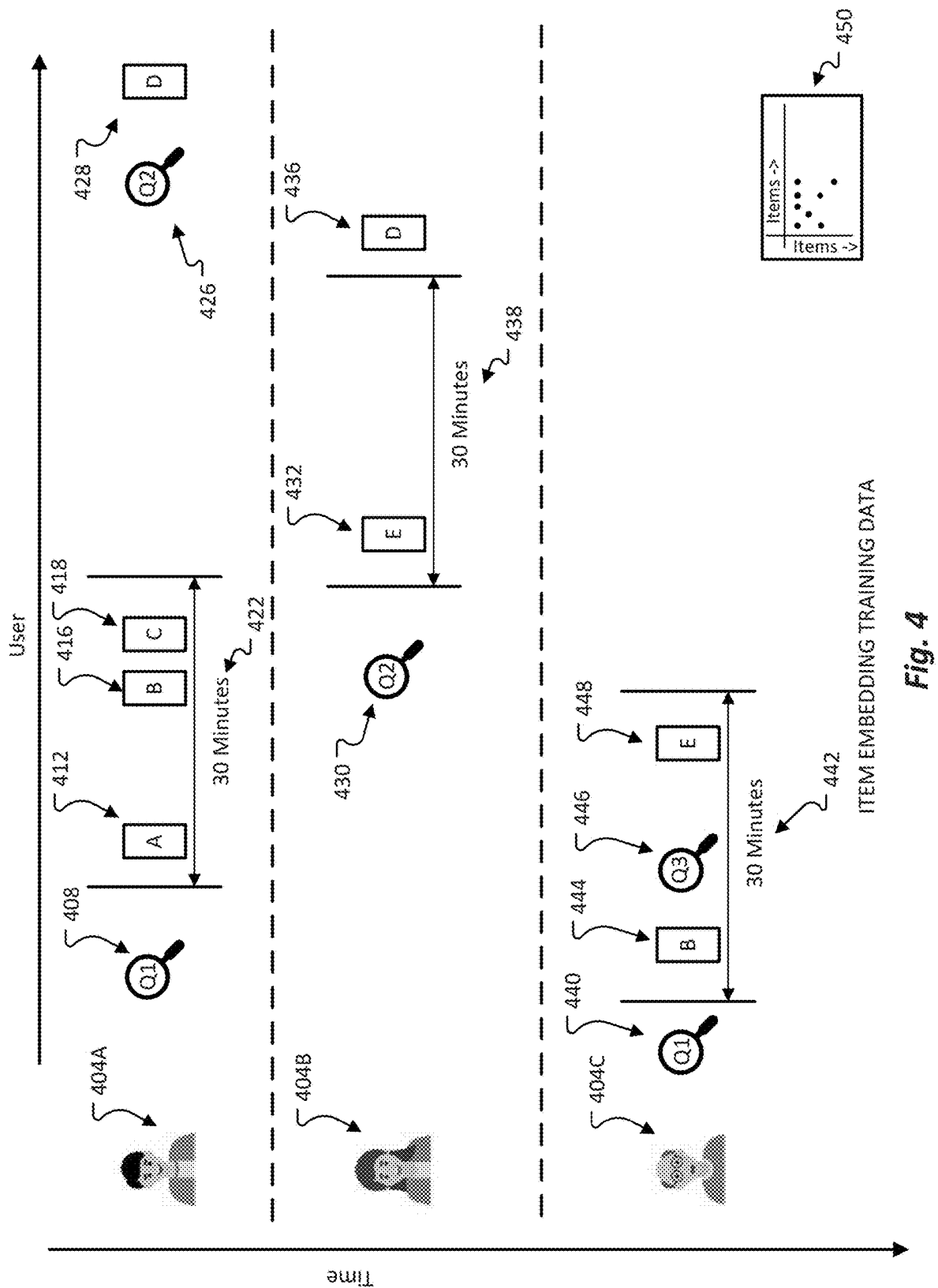
FIG. 4 depicts details directed to obtaining item training data in accordance with examples of the present disclosure.

As further provided in FIG. 4, no item-item pairs may be obtained for user 404B, multiple selected items from a query 430 are not included in the same session 438. That is, item E 432 and item D 436 occur in different sessions. Similarly, while item B 444 and item E 448 may be selected or clicked by the user 404C in response to a query 440 and query 446, an item-item pair may not be obtained even though such selection occurs in the same session 442 because each selection is in response to a different query. Alternatively, or in addition, item B 444 and item E 448 having been selected or clicked by the user 404C in response to a query 440 and query 446, may form an item-item pair because such selection occurs in the same session 442 even though the selection occur in response to different queries.

Figure 5:
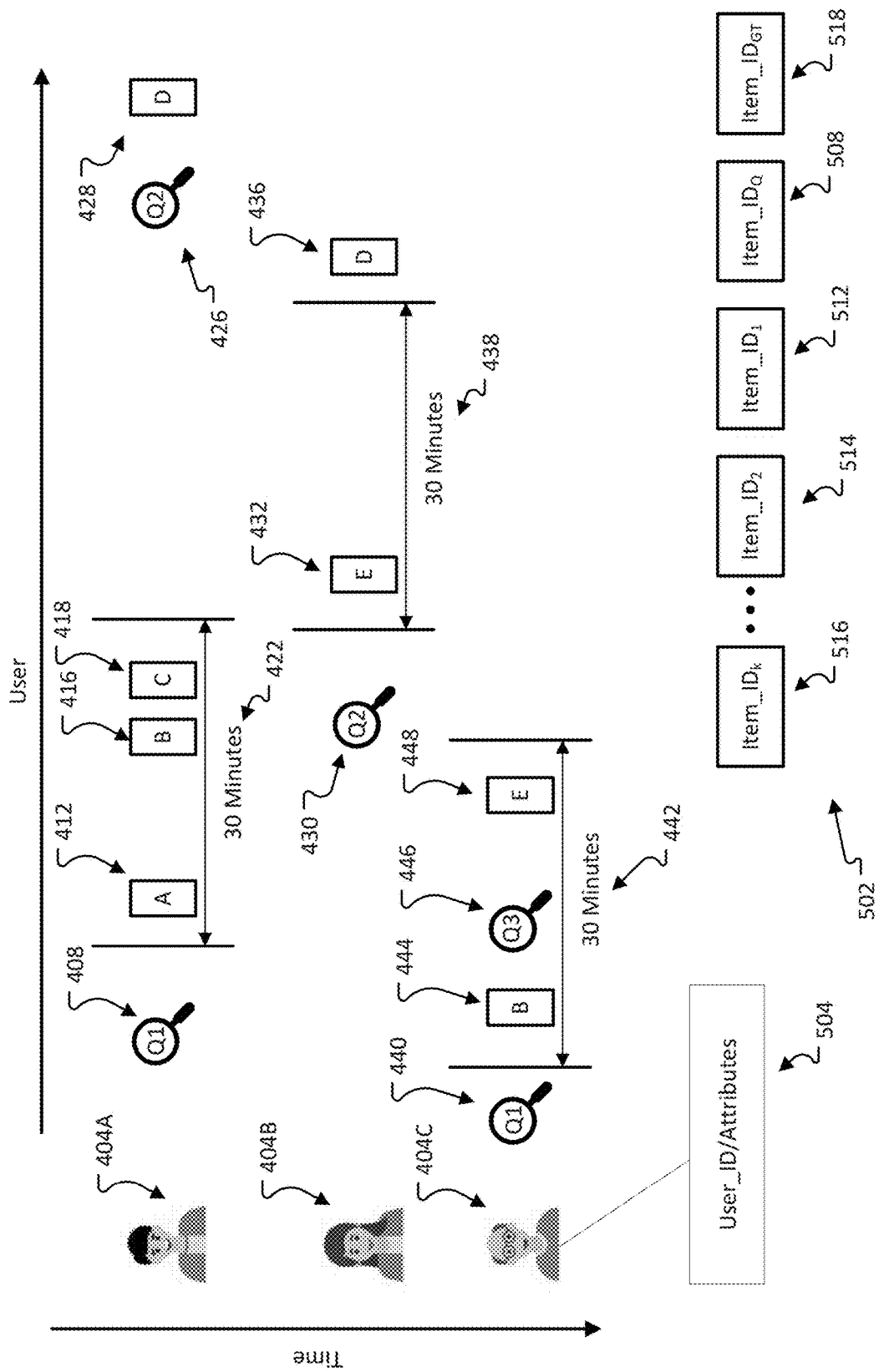
FIG. 5 depicts additional details directed to obtaining user embedding training data in accordance with examples of the present disclosure.

FIG. 5 depicts additional details directed to obtaining user embedding training data in accordance with examples of the present disclosure. In examples, the user embedding training data may be obtained for training a user embedding model to predict a next clicked item (e.g., image) based on search history and/or click history and user attributes. When training a model for a specific user, an input to the user model may include a user component that encodes a user identifier and other attributes, and a context component that encodes a current query image (e.g., item) and recently clicked items (e.g., images) by the user, using the trained item embeddings.

Thus, unique user identifiers and attributes may be obtained for each user based on a user profile. For example, a profile 504 for user 404C may include a user identifier or otherwise provide for the generation of a user identifier. In addition, user related attributes may be obtained based on information in the user profile. For example, attributes, such as but not limited to language, gender, age, location, etc. may be obtained. In some examples, some attributes may be featurized into one-hot or dense features based on whether they are categorical and/or binary in nature. The context component involving the current query image and user history may be obtained by identifying an item identifier of the query, and a list of k item identifiers corresponding to recently clicked items by the user. For example, when k=1, item B 416 may be considered to be query and item A 412 may be considered to be the search history. Further, item C 418 may be considered to be the ground truth next click. By incrementing the user's history in a similar fashion (e.g., moving to the next item in the user click log or search history), item C 418 may be considered to be the query item, item B 416 may be considered to be the search history, and another item may be considered to be the ground truth next click. As a result, a list of contexts may be formed for each user which includes queries, historical items and ground-truth next clicks, which will be used to optimize the user embeddings. For example, a list of contexts may be presented as items 502 (where item 508 may be a query, item 512-516 may be search history, and item 518 may be a ground truth next click for example. Accordingly, to train a user model, the user components and context components may be used, where the user components include the user-related embeddings and the context components include the query, the previous clicked items, and the ground-truth next click.

Figure 6:
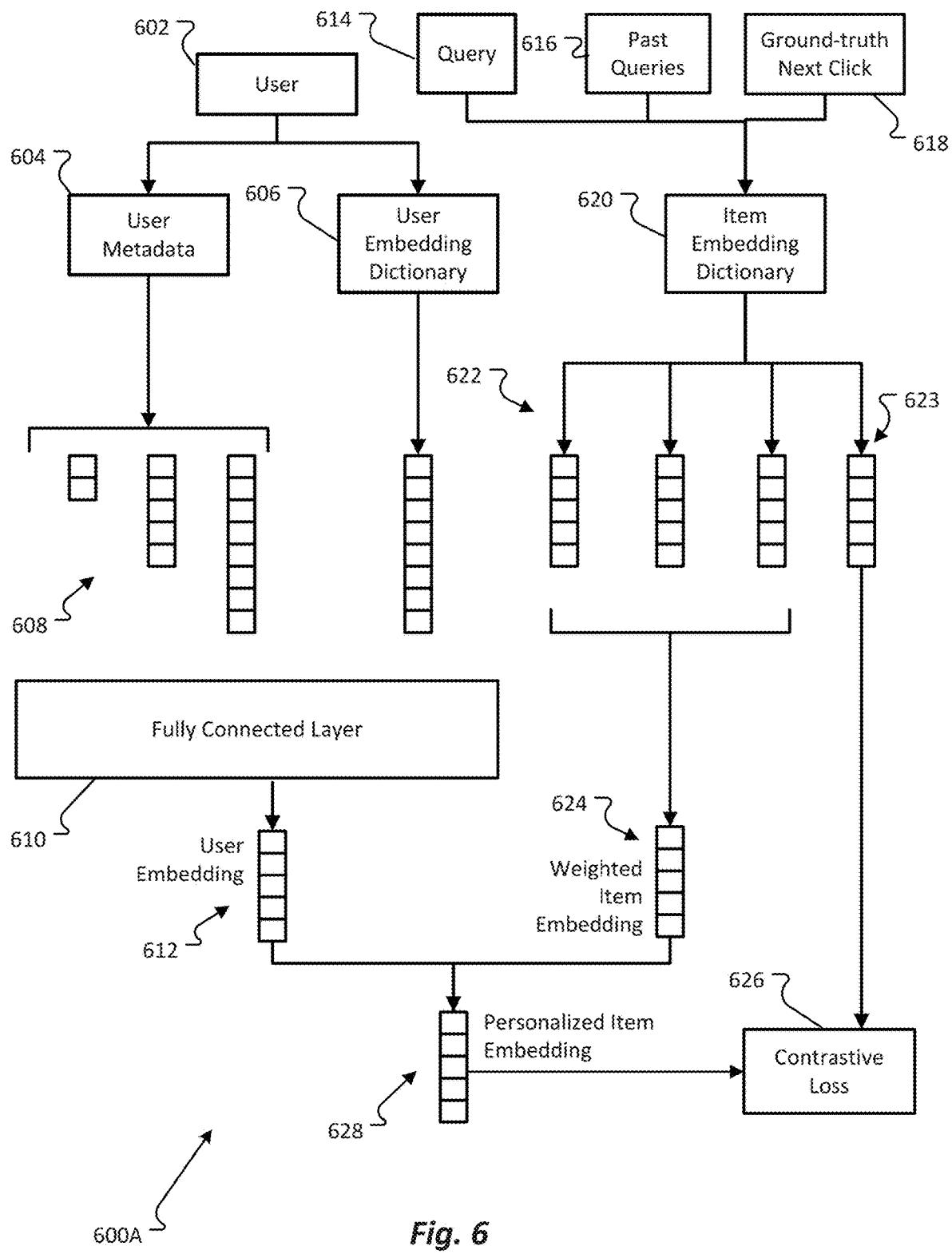
FIG. 6 depicts additional details of training an attention user-item-model in accordance with examples of the present disclosure.

FIG. 6 depicts additional details of training an attention user-item-model 600 in accordance with examples of the present disclosure. In examples, the attention user-item-model 600 may be the same as or similar to the personalized item embedding generator 206, personalized item embedding generator 302, and/or personalized item embedding generator 301. In examples, user meta data 604 associated with a user 602 may be obtained from a user profile or otherwise. For example, unique user identifiers and attributes may be obtained for each user based on a user profile. A user profile may include a user identifier or otherwise provide for the generation of a user identifier. User related attributes 608 may be obtained based on information in the user profile. For example, attributes, such as but not limited to language, gender, age, location, etc. may be obtained. In some examples, some attributes may be featurized into one-hot or dense features based on whether they are categorical and/or binary in nature. A list of contexts may be received for each user, where the list of contexts may include queries, historical items and ground-truth next clicks, used to optimize the user embeddings. Accordingly, to train a user specific model, such as the user embedding dictionary 606, the user components and context components may be used, where the user components include the user-related embeddings and the context components include the query, the previous clicked items, and the ground-truth next click. A fully connected layer 610 of a neural network may receive the embedding from the user embedding dictionary 606, as well as the user related attributes 608. During a training process, one or more parameters of the fully connected layer may be modified such that the fully connected layer 610 generates a user embedding 612. The user embedding 612 may be the same as or similar to the user embedding 322 and/or 342 as previously described.

Item embeddings 622 indicative of the query item image 614 and one or more search history query images 616 may be generated using an item embedding dictionary 620. Each of the item embeddings 622 may be generated according to one or more item embedding dictionaries 620 based on item-item interactions. That is, an item embedding 622 may be a vector representation of items, or images, constructed from item-item interactions. For example, items, or images, that have similar patterns of interaction would most likely have similar item embeddings; as such item embeddings 622 obtained from the item embedding dictionary 620 may be aligned based on item-item interaction information obtained from the data structure or matrix, such as the matrix 450. As previously discussed, a sparse-efficient implementation of a Bayesian Personalized Ranking algorithm may be utilized to modify the matrix from which the item embeddings 622 may be generated. During a training process, an item embedding 623 may be generated based on the ground-truth next click image 618.

In examples, the item embeddings 622 may be weighted and combined to generate a weighted item embedding 624, which may be the same as or similar to the weighted item embedding 338 previously discussed. That is, a weighted item embedding 624 may be generated based on the item embedding generated for the query image 614 and the item embeddings resulting from the search history or past query images 616. Thus, item information is obtained not only for the current item or image that a user is basing a query on, but also for clicked or selected items specific to the user search history. As previously discussed, a query image 614 may be obtained from the training data generated from user click log information. Thus, the query image 614 may correspond to a position of an image in the user click log or search history, such as described with respect to 502. In examples, the weighting of the item embeddings 622 including the item embedding generated for the query image 614 and the search history item embeddings corresponding to the past query images 616 may be optimized utilizing an optimization model. For example, a weighting for a search history item embedding may be based on a plurality of different user sessions. In some examples, the weighting for a search history item embedding may be static, dynamic, and/or may be obtained during the training of the user-attention-item model 600A.

The weighted item embedding 624 may then be combined with the user embedding 612 to generate a personalized item embedding 628, where the personalized item embedding 628 may be the same as or similar to the personalized item embedding 320 and/or 346 previously described. For example, the personalized item embedding 628 may be obtained as an element-wise product between the weighted item embedding 624 and the user embedding 612. During the training of the user-attention-item model 600A, one or more model parameters associated with the fully connected layer 610, the weighted item embedding generation process, and the user embedding dictionary 606 may be modified based on minimizing an error, or loss, between the item embedding 623 generated for the ground-truth next click image 618 and the personalized item embedding 628; in examples, a contrastive loss function 626 may be used to for such basis.

Figure 7:
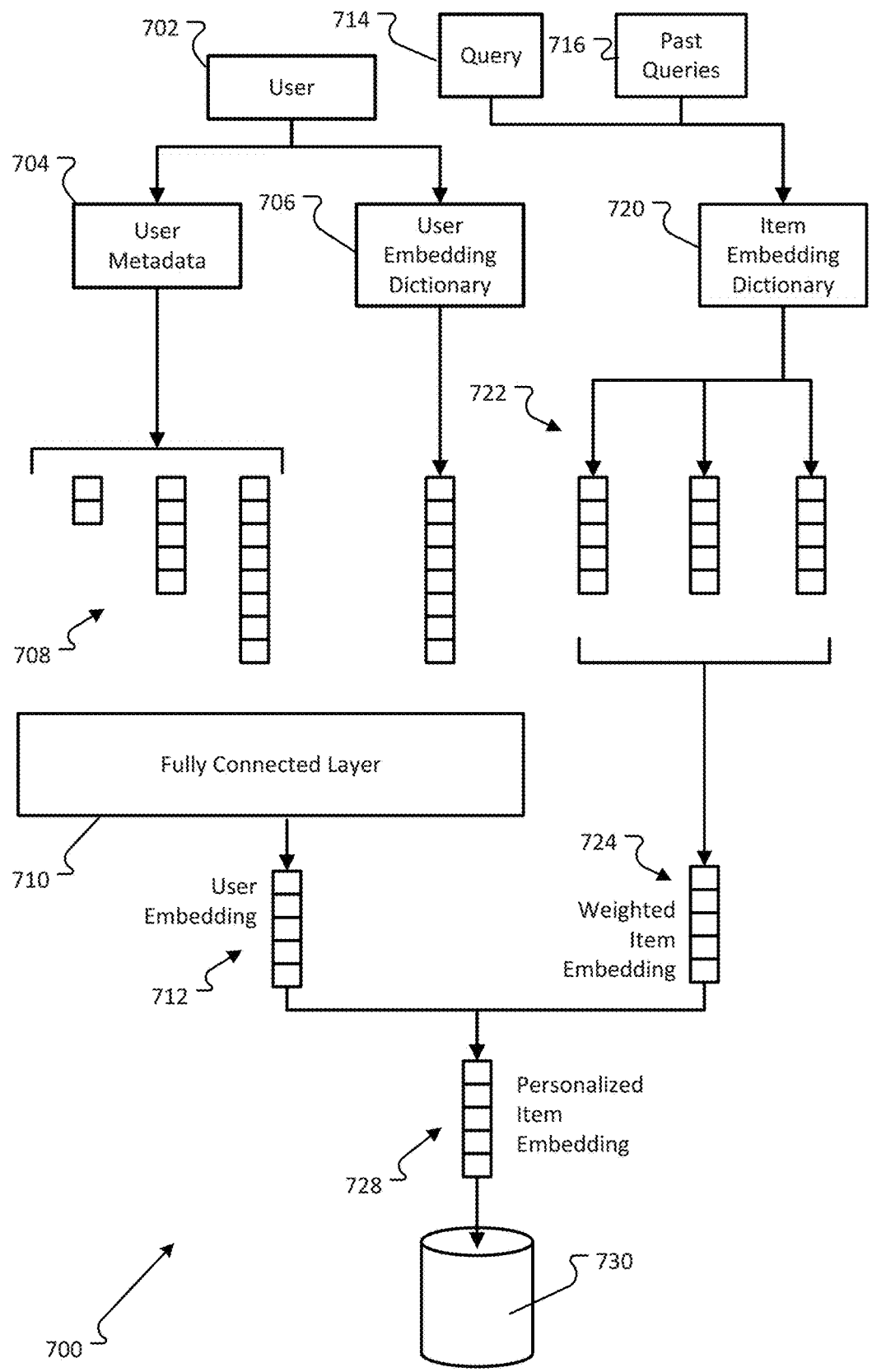
FIG. 7 depicts additional details directed to obtaining a personalized item embedding based on a trained attention user-item-model in accordance with examples of the present disclosure.

FIG. 7 depicts additional details directed to obtaining a personalized item embedding 728 based on a trained attention user-item-model 700 in accordance with examples of the present disclosure. In examples, the attention user-item-model 700 may be the same as or similar to the personalized item embedding generator 206, personalized item embedding generator 302, and/or personalized item embedding generator 301 and may represent user-item-attention model obtained as a result of training the process of FIG. 6. In examples, user meta data 704 associated with a user 702 may be obtained from a user profile or otherwise. For example, unique user identifiers and attributes may be obtained for each user based on a user profile. A user profile may include a user identifier or otherwise provide for the generation of a user identifier. User related attributes 708 may be obtained based on information in the user profile. For example, attributes, such as but not limited to language, gender, age, location, etc. may be obtained. In some examples, some attributes may be featurized into one-hot or dense features based on whether they are categorical and/or binary in nature. A list of contexts may be received for each user, where the list of contexts may include queries, historical items and ground-truth next clicks, used to optimize the user embeddings. Accordingly, a trained user specific model, such as the user embedding dictionary 706 may be used, where user components include user-related embeddings and context components include the query, the previous clicked items, and the ground-truth next click. A trained fully connected layer 710 of a neural network may receive the embedding from the user embedding dictionary 706, as well as the user related attributes 708. The user embedding 712 may be the same as or similar to the user embedding 322 and/or 342 as previously described.

Item embeddings 722 indicative of the query item image 714 and one or more search history query images 716 may be generated using an item embedding dictionary 720. Each of the item embeddings 722 may be generated according to one or more item embedding dictionaries 720 based on item-item interactions. That is, an item embedding 722 may be a vector representation of items, or images, constructed from item-item interactions, such as the matrix 450.

In examples, the item embeddings 722 may be weighted and combined to generate a weighted item embedding 724, which may be the same as or similar to the weighted item embedding 338 previously discussed. That is, a weighted item embedding 724 may be generated based on the item embedding generated for the query image 714 and the item embeddings resulting from the search history or past query images 716. Thus, item information is obtained not only for the current item or image that a user is basing a query on, but also for clicked or selected items specific to the user search history.

The weighted item embedding 724 may then be combined with the user embedding 712 to generate a personalized item embedding 728, where the personalized item embedding 728 may be the same as or similar to the personalized item embedding 320 and/or 346 previously described. The personalized item embedding 728 may be obtained as an element-wise product between the weighted item embedding 724 and the user embedding 712. The personalized item embedding 728 is used to search the ANN table 730 to provide the candidate images, or candidate image embeddings, as previously discussed. The candidate images, or candidate image embeddings, may then be provided to an engagement-based ranker, a diversity ranker, and/or a user.

Figure 8:
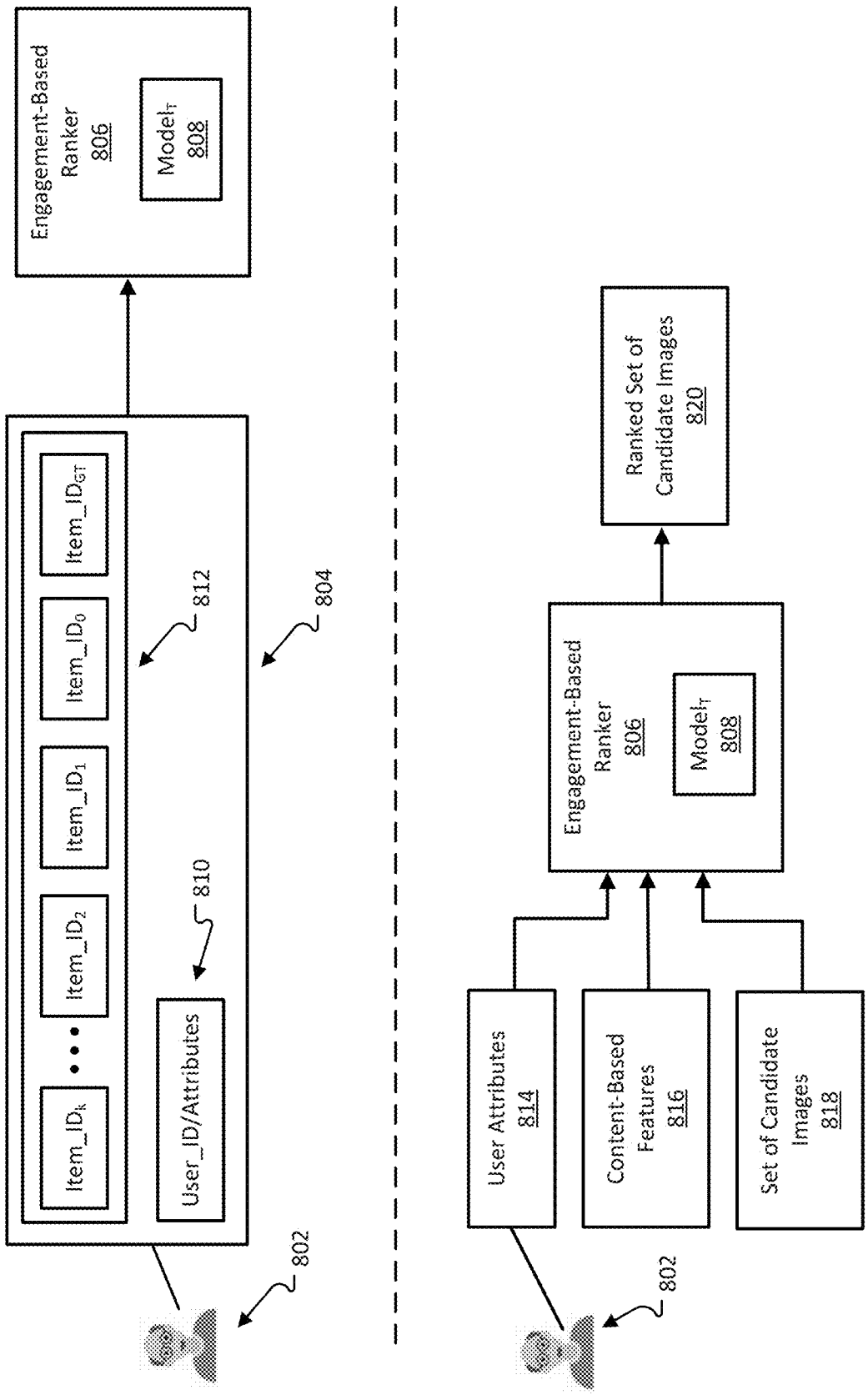
FIG. 8 depicts additional details directed to the engagement-based ranker in accordance with examples of the present disclosure.

FIG. 8 depicts additional details directed to the engagement-based ranker 806 in accordance with examples of the present disclosure. More specifically, the engagement-based ranker 806 may include a transformer-based neural network model 808, and be trained using user information including user click logs 812 and user attributes 804. The user attribute 804 may be include information obtained from or otherwise based on a user profile and attributes 810. For example, the user profile and attributes may provide information about a user 802 that includes, but is not limited to language, gender, age, location, etc. In addition, the user click log 812 generally indicates a measure of user engagement with one or more images selected, or clicked, by the user. In examples, the user click log 812 may be a sequential list of images clicked by a user. In some examples, additional information, such as content-based features extracted from the images in the user click log may be provided to the engagement-based ranker 806 as training data.

Alternatively, or in addition, the user click log may include query specific, session specific, and/or content specific items. Thus, the neural network model 808 of the engagement-based ranker 806 may be trained on the user attributes 804 to predict an indication of user engagement with clicked or selected content. Alternatively, or in addition, the neural network model 808 of the engagement-based ranker 806 may be trained on the user attributes 804, using a ground-truth next-click image from the user click log 812 to predict an indication of user engagement based on previously clicked images and/or in response to a query image, which in some instances may be Item IDo.

In accordance with examples of the present disclosure, a set of candidate images 818 may be received by the engagement-based ranker 806 and ranked using the trained model 808 to rank the set of candidate images 818 according to a predicted level of user interaction. In examples, the engagement-based ranker 806 may receive user attributes 814, which may be the same as or similar to the user attributes 804. In addition, the engagement-based ranker 806 may receive the set of candidate images 818 for ranking, where the set of candidate images may be the same as or similar to the candidate embeddings 212 as previously described. The engagement-based ranker 806 may be the same as or similar to the engagement-based ranker 130 and the engagement ranker 236 as previously described. Accordingly, the set of candidate images 820 may be ranked based on user attributes, such as location, age, gender, and content-based features 816, such as Deep Neural Network (DNN) embeddings, dominant colors, dominant objects, etc.

Figure 9:
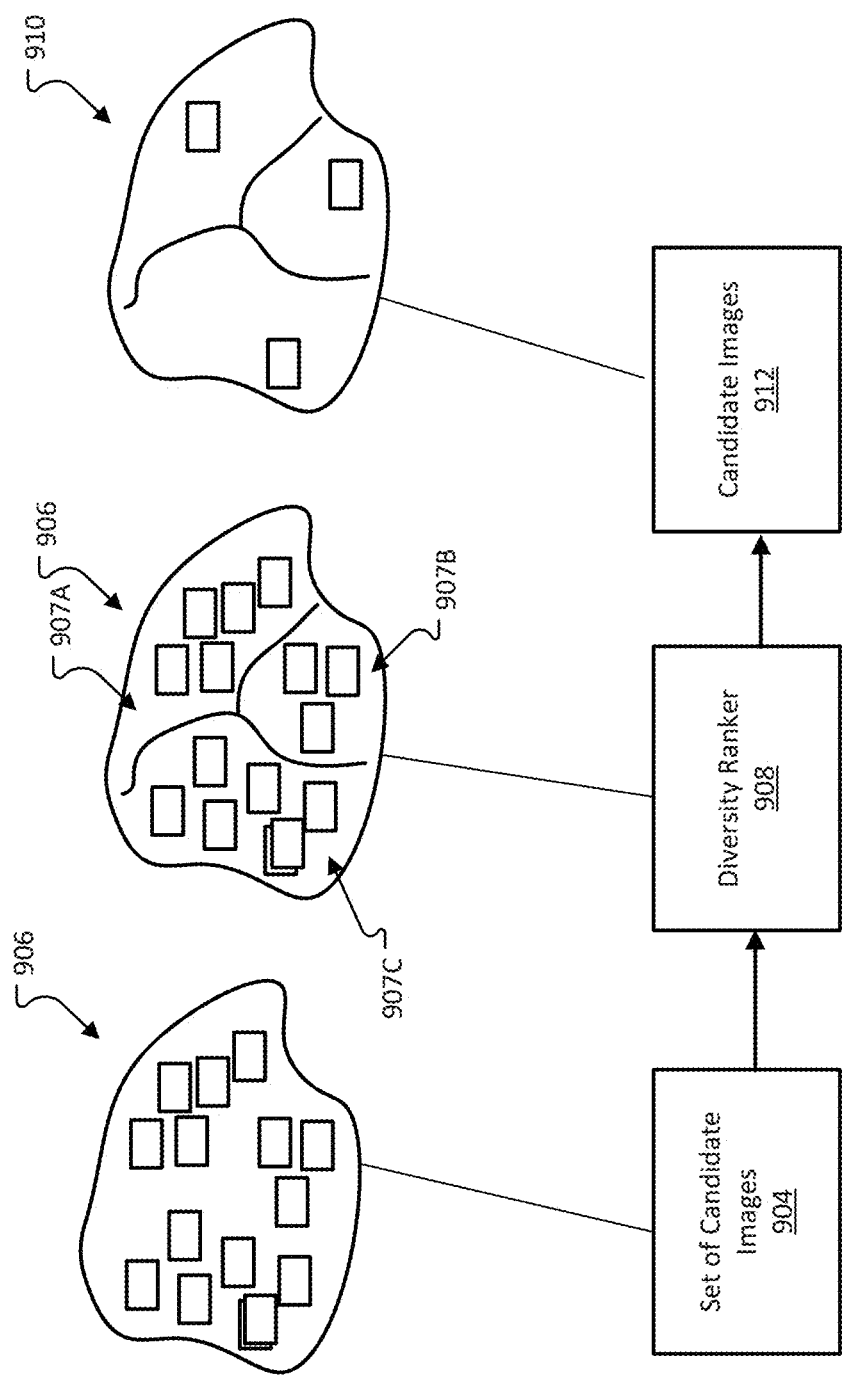
FIG. 9 depicts additional details directed to the diversity ranker in accordance with examples of the present disclosure.

FIG. 9 depicts additional details directed to the diversity ranker 908 in accordance with examples of the present disclosure. The diversity ranker 908 may be the same as or similar to the diversity ranker 132 and/or the embedding diversity ranker 222 as previously described. More specifically, a set of candidate images 904, which may be a ranked set of candidate images obtained from an engagement-based ranker, may be processed by the diversity ranker 908 to maximize a distance between each of candidate images in the set of candidate images 904 based on a given feature vector. Content-based features may be used for the purpose of maximizing visual diversity such that the candidate images 912 resulting from the diversity ranker 908 may be sufficiently different from one another. In examples, the diversity ranker 908 may utilize a determinantal point process (DPP) algorithm to maximize the distance (e.g., visual differences in the images) between results.

As further depicted in FIG. 9, a set of candidate images 904 may be represented as the set of images 906. In some instances, the images in the set of images 906 may be grouped or otherwise identified as being visually similar to, and in some instances the same as, other images included in the set of images 906. The diversity ranker 908 may determine such images, for example, by identifying groups of images 907A, 907B, and 907C for example. Further, the diversity ranker 908 may identify or select a number of visually distinct images based on a calculated distance between each image. For example, based on the dissimilarity of images within the group and/or the by maximizing visual diversity between images of different groups, three images (e.g., in candidate images 910) may be identified. In instances where a DPP algorithm is utilized, the DPP algorithm may sample the set of candidate images 904 to reduce similar images and maximize the distance (e.g., visual differences in the images) between results. Alternatively, or in addition, the DPP algorithm may rank each of the images in the set of candidate images 904 according to visual diversity and return the set of candidate images 904 as a ranked set of candidate images 912.

Figure 10:
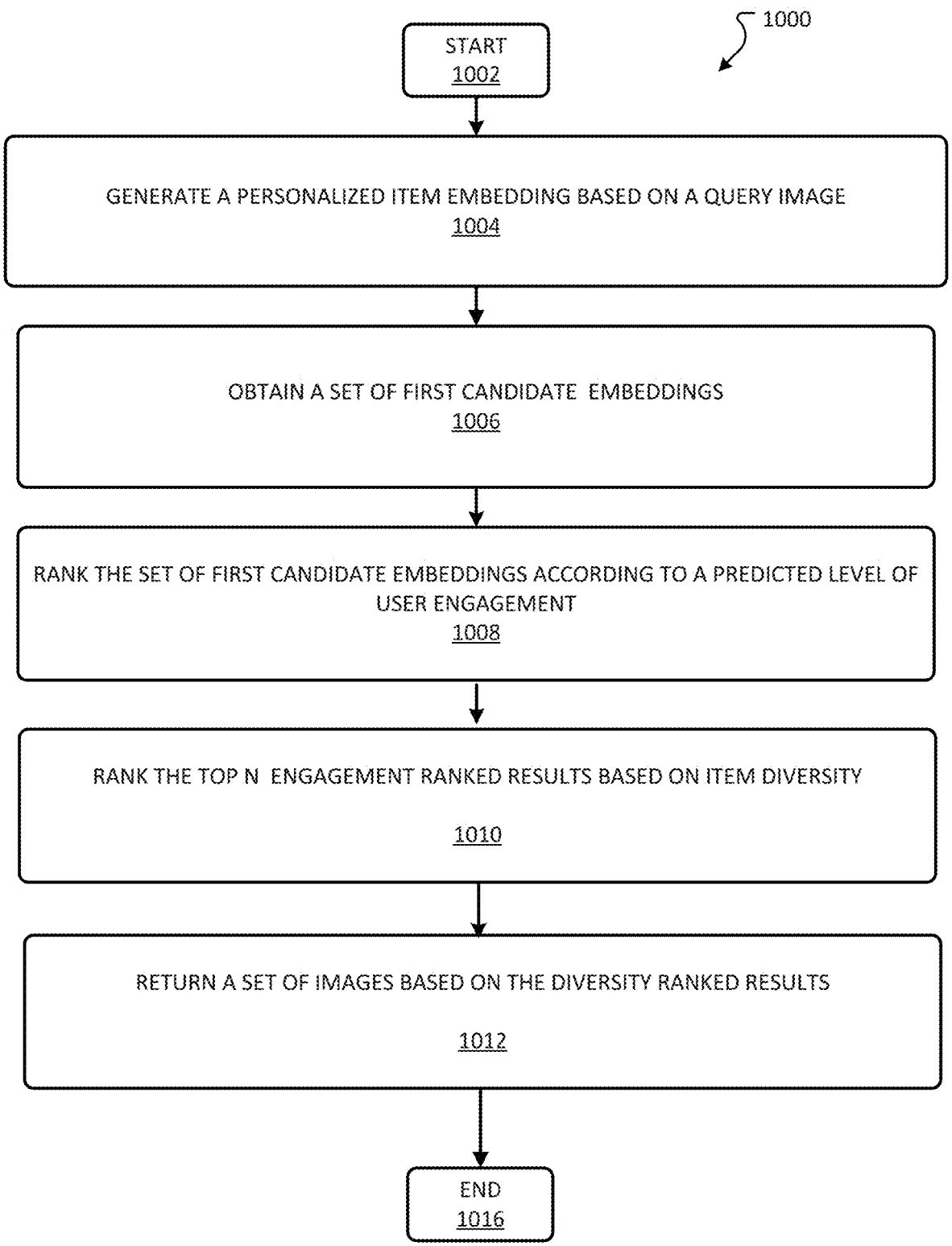
FIG. 10 depicts details of an example method for obtaining a set of images from a web-scale personalized visual search system in accordance with examples of the present disclosure.

FIG. 10 depicts details of an example method 1000 for obtaining a set of images from a web-scale personalized visual search system in accordance with examples of the present disclosure. A general order for the steps of the method 1000 is shown in FIG. 10. Generally, the method 1000 starts at 1002 and ends at 1016. The method 1000 may include more or fewer steps or may arrange the order of the steps differently than those shown in FIG. 10. The method 1000 can be executed as a set of computer-executable instructions executed by a computer system and encoded or stored on a computer-readable medium. Further, the method 1000 can be performed by gates or circuits associated with a processor, Application Specific Integrated Circuit (ASIC), a field-programmable gate array (FPGA), a system on chip (SOC), graphics processing unit (GPU), or other hardware device. Hereinafter, the method 1000 shall be explained with reference to the systems, components, modules, software, data structures, user interfaces, etc. described in conjunction with FIGS. 1-9.

The method 1000 begins at operation 1002 and proceeds to 1004, where a web-scale personalized visual search system, such as the web-scale personalized visual search system 120 may receive a query from a user, where the query includes an image. Based on the query, a personalized item embedding may be obtained. In examples, the personalized item embedding may be based on an item embedding generated from an image included in the query, based on item embeddings generated from images included in a search history of the user that submitted the query, based on user meta data information obtained from a profile, for example, of the user that submitted the query, and/or combinations thereof. The method 1000 may proceed to 1006, where a first set of candidate results are obtained. In examples, the first set of candidate results may be obtained via index selection of an Approximated Nearest Neighbor (ANN) table using the personalized item embedding. In some examples, the candidate images may be obtained using a content-based ANN table 124 that provides visually and semantically related image results.

The method 1000 may proceed to 1008, where the first set of candidate embeddings may be ranked according to a predicted level of user engagement. For example, an engagement ranker may rank each of the images/embeddings in the first set of candidate embeddings based on a predicted level, or measure, of user engagement. For example, the engagement-based ranker may rank an image predicted to have a high level of user engagement higher than an image predicted to have a low level of user engagement. In examples, the engagement ranker may consider user attributes, such as location, age, gender, and/or content-based features, such as Deep Neural Network (DNN) embeddings, dominant colors, dominant objects, etc., when ranking each of image/embedding in the first set of embeddings. The method 1000 may then proceed to 1010, where at least some of the engagement ranked results of the set of first candidate embeddings may be further ranked by a diversity ranker to maximize visual diversity such that the candidate images resulting from being diversity ranked may be sufficiently different from one another. The method 1000 may then proceed to 1012, where a set of images resulting from being ranked according to diversity and/or user engagement may be returned to a user. The method 1000 may end at 1016.

Figure 11:
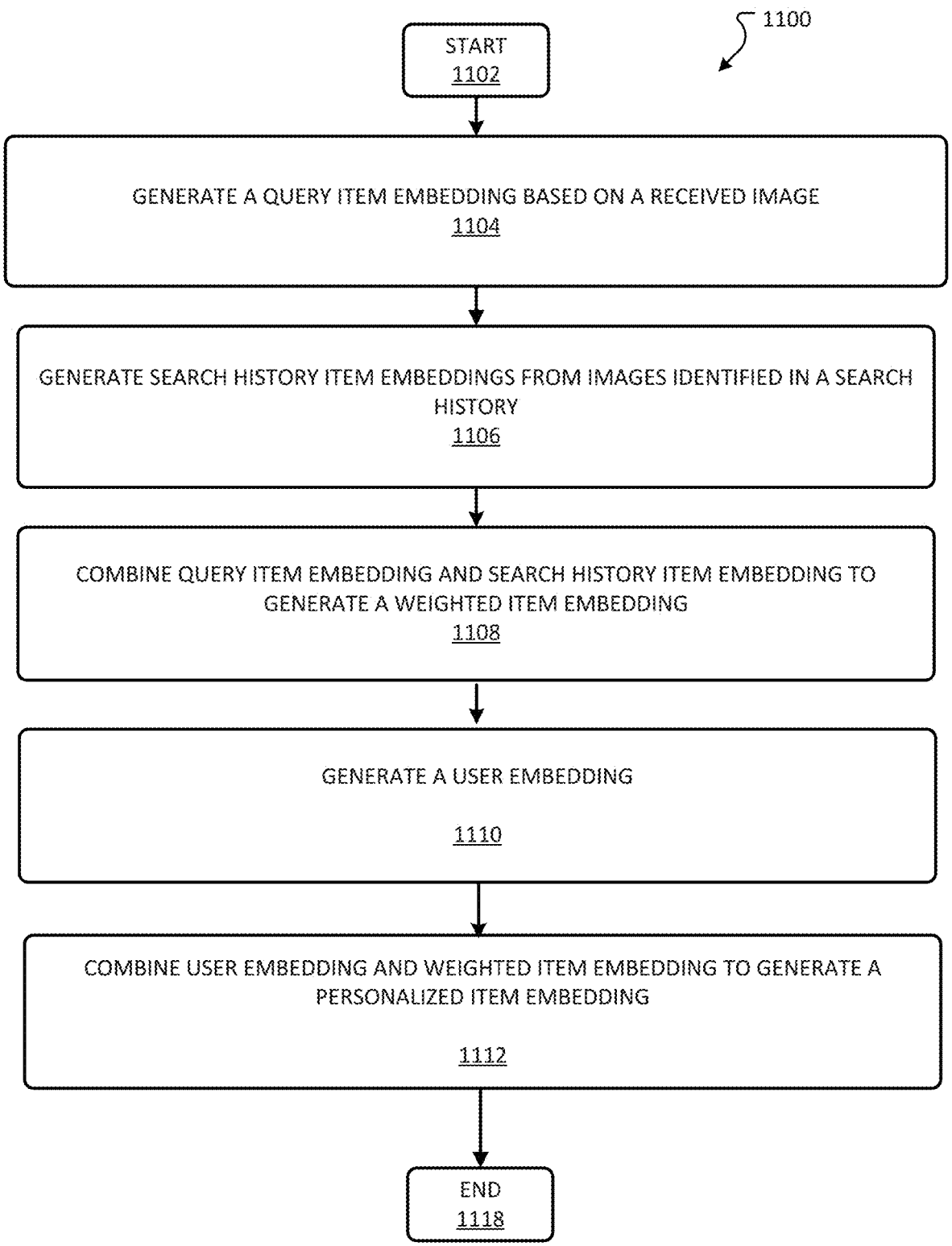
FIG. 11 depicts details of an example method for obtaining personalized item embedding in accordance with examples of the present disclosure.

FIG. 11 depicts details of an example method 1100 for obtaining personalized item embedding in accordance with examples of the present disclosure. A general order for the steps of the method 1100 is shown in FIG. 11. Generally, the method 1100 starts at 1102 and ends at 1118. The method 1100 may include more or fewer steps or may arrange the order of the steps differently than those shown in FIG. 11. The method 1100 can be executed as a set of computer-executable instructions executed by a computer system and encoded or stored on a computer-readable medium. Further, the method 1100 can be performed by gates or circuits associated with a processor, Application Specific Integrated Circuit (ASIC), a field-programmable gate array (FPGA), a system on chip (SOC), graphics processing unit (GPU), or other hardware device. Hereinafter, the method 1100 shall be explained with reference to the systems, components, modules, software, data structures, user interfaces, etc. described in conjunction with FIGS. 1-10.

The method 1100 begins at operation 1102 and proceeds to 1104, where a query item embedding may be generated based on an image received in a query. In some examples, an item embedding generator, such as but not limited to the item embedding generator 328, may generate an item embedding according to one or more item embedding dictionaries based on item-item interactions. The method 1100 may proceed to 1106 to obtain a search history from a computing device and/or a search history associated with a user profile of a user. The obtained search history may include or otherwise identify items clicked or selected by the user. That is, the search history may include clicks of items, such as images, which can be used to balance a current query and the past queries. Thus, an item embedding generator may generate search history item embeddings and provide the search history item embeddings to a weighted item embedding generator. Accordingly, the method may proceed to 1108, where the query item embedding and the search history item embedding(s) may be combined to generate a weighted item embedding. The method 1100 may then proceed to 1110 to generate a user embedding.

In examples, at 1110, a user embedding generator, such as the user embedding generator 340, may generate a user embedding based on user information and/or search history associated with the user. In examples, the user information may include user meta data including, but not limited to, user age, demographic, gender, and/or location information. Thus, a generated user embedding may be configured to "personalize" the weighted item embedding generated at 1108. In examples, the user embedding may be generated using an attention-user item model to predict a next click, or selected image, of a user based on a click history derived from the search history of the user. The user embedding can therefore amplify the weighted item embedding. In examples, the user embedding may be a combination of a user embedding obtained from a dictionary (e.g., a trained model to predict the next click, or image selection of a user), and then combined with user metadata. Thus, the user embedding can be treated as an attention for the weighted item embedding so that a subspace of the item embedding which the user is interested in can be focused on or otherwise identified. At 1112, an embedding generator, such as the embedding generator 344, may then perform an element-wise product operation between the weighted item embedding and the user embedding to form a personalized item embedding. The method 1000 may then end at 1118.

Figure 12:
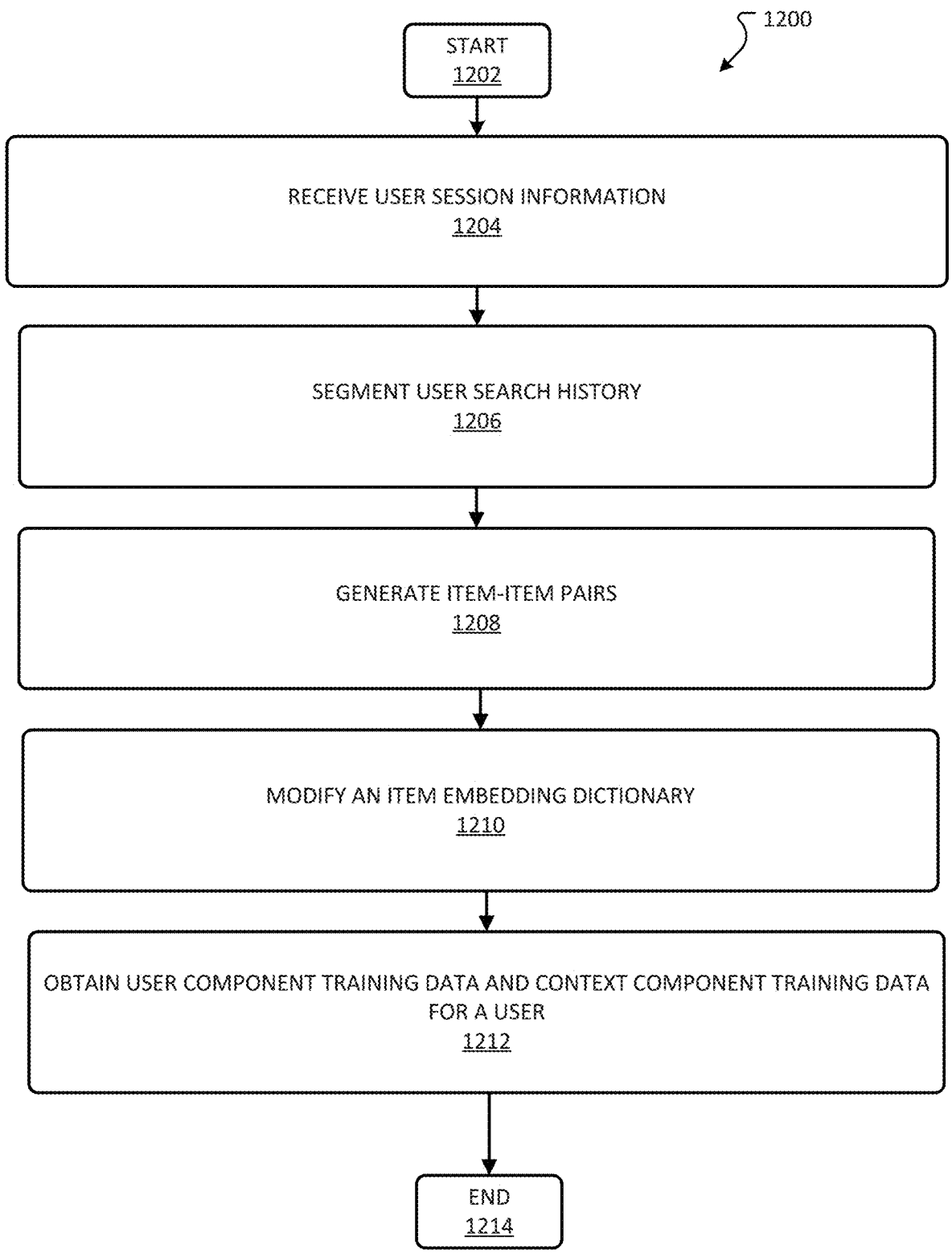
FIG. 12 depicts details of an example method for obtaining training data for a web-scale personalized recommendation system and training a user-item-model in accordance with examples of the present disclosure.

FIG. 12 depicts details of an example method 1200 for obtaining training data for a web-scale personalized recommendation system and training a user-item-model in accordance with examples of the present disclosure. A general order for the steps of the method 1200 is shown in FIG. 12. Generally, the method 1200 starts at 1202 and ends at 1214. The method 1200 may include more or fewer steps or may arrange the order of the steps differently than those shown in FIG. 12. The method 1200 can be executed as a set of computer-executable instructions executed by a computer system and encoded or stored on a computer-readable medium. Further, the method 1200 can be performed by gates or circuits associated with a processor, Application Specific Integrated Circuit (ASIC), a field-programmable gate array (FPGA), a system on chip (SOC), graphics processing unit (GPU), or other hardware device. Hereinafter, the method 1200 shall be explained with reference to the systems, components, modules, software, data structures, user interfaces, etc. described in conjunction with FIGS. 1-11.

The method 1200 begins at operation 1202 and proceeds to 1204. To generate high quality user and item embeddings, two training data generation processes maybe performed. To obtain item-item interaction pairs needed to optimize or otherwise train an item embedding model, positive user interactions occurring across user sessions are collected to from user session information and/or user logs. Accordingly, at 1204, user session information, such as user click history, search history, or the like may be received. In examples, one or more user sessions for a user may be defined as a period of time (e.g., seconds, minutes, hours, e.g.) during which a user may search using one or more search queries. Thus, the method 1200 may proceed to 1206, where user search history may be segmented by a session duration and/or query. For example, a search history may be segmented into thirty-minute sessions. Alternatively, or in addition, the search history may be segmented according to search queries. At 1208, item-item pairs may be generated from the search history, where two items may be considered to be an item-item pair if the items are clicked, or otherwise selected, within the same session by the user and/or for a same query by the user. At 1210, a sparse-efficient implementation of a Bayesian Personalized Ranking algorithm may be utilized to modify a matrix from which item embeddings may be generated.

In addition to obtaining training data to generate item embeddings, training data to obtain user embeddings may also be obtained. That is, user embedding training data may be obtained for training a user embedding model to predict a next clicked item (e.g., image) based on search history and/or click history and user attributes. In examples, the method may proceed to 1210, where training data for a specific user may be obtained that includes user component information encoding a user identifier and other attributes, and a context component encoding a current query image (e.g., item) and recently clicked items (e.g., images) by the user. Thus, unique user identifiers and attributes may be obtained for each user based on a user profile. In examples, attributes, such as but not limited to language, gender, age, location, etc. may be obtained. In some examples, some attributes may be featurized into one-hot or dense features based on whether they are categorical and/or binary in nature. The context component involving a current query image and user history may be obtained by identifying an item identifier of the query, and a list of k item identifiers corresponding to recently clicked items by the user. For example, and as described with respect to FIG. 5, the user's search history can be incremented to establish a ground truth next click corresponding to a query image and previous clicked or searched images. As a result, at 1212 for example, a list of contexts which includes queries, historical items and ground-truth next clicks may be formed for each user, and can be used to optimize the user embeddings. The method 1200 may end at 1214.

Figure 13:
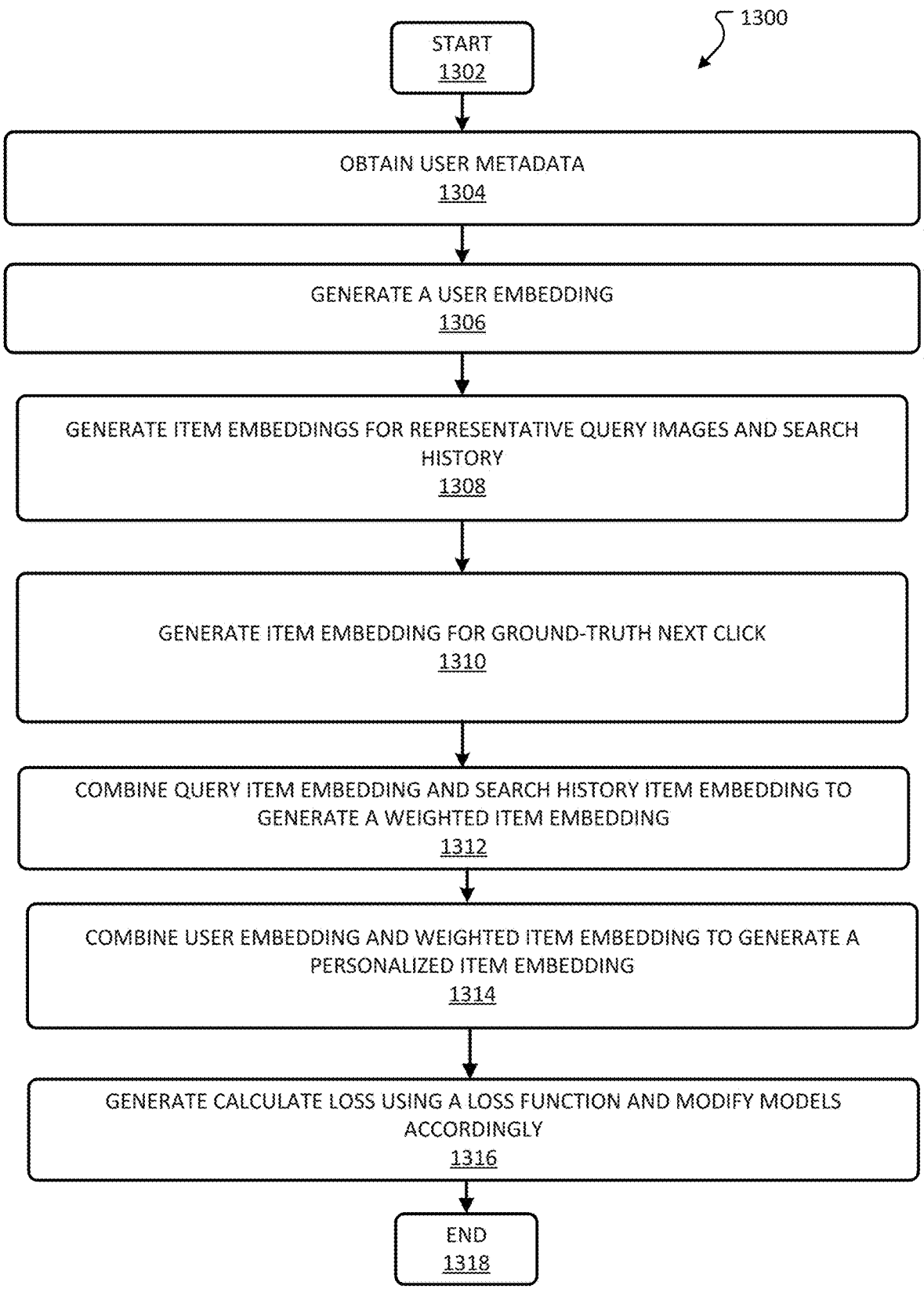
FIG. 13 depicts details of an example method for training an attention-user-item model for a web-scale personalized recommendation system in accordance with examples of the present disclosure.

FIG. 13 depicts details of an example method 1300 for training an attention-user-item model for a web-scale personalized recommendation system in accordance with examples of the present disclosure. A general order for the steps of the method 1300 is shown in FIG. 13. Generally, the method 1300 starts at 1302 and ends at 1318. The method 1300 may include more or fewer steps or may arrange the order of the steps differently than those shown in FIG. 13. The method 1300 can be executed as a set of computer-executable instructions executed by a computer system and encoded or stored on a computer-readable medium. Further, the method 1300 can be performed by gates or circuits associated with a processor, Application Specific Integrated Circuit (ASIC), a field-programmable gate array (FPGA), a system on chip (SOC), graphics processing unit (GPU), or other hardware device. Hereinafter, the method 1300 shall be explained with reference to the systems, components, modules, software, data structures, user interfaces, etc. described in conjunction with FIGS. 1-12.

The method 1300 begins at operation 1302 and proceeds to 1304. In examples, user meta data associated with a user may be obtained from a user profile or otherwise. For example, unique user identifiers and attributes may be obtained for each user based on a user profile. A user profile may include a user identifier or otherwise provide for the generation of a user identifier. User related attributes may be obtained based on information in the user profile. For example, attributes, such as but not limited to language, gender, age, location, etc. may be obtained. In some examples, some attributes may be featurized into one-hot or dense features based on whether they are categorical and/or binary in nature. A list of contexts may be received for each user, where the list of contexts may include queries, historical items and ground-truth next clicks, used to optimize the user embeddings. Accordingly, to train a user specific model, such as the user embedding dictionary, the user components and context components may be used and provided to the user specific model or user embedding dictionary, where the user components include the user-related embeddings and the context components include the query, the previous clicked items, and the ground-truth next click. A user embedding provided from a user embedding dictionary may be provided to fully connected layer together with other user related attributes to generate a user embedding at 1306.

At 1308, an item embedding may be generated for an item based on a query item image from the collected or obtain item training data and one or more search history query images collected from the item training data. In examples, the query item embedding and the search history item embedding may be obtained from an item embedding dictionary. That is, an item embedding may be a vector representation of items, or images, constructed from item-item interactions. For example, items, or images, that have similar patterns of interaction would most likely have similar item embeddings; as such item embeddings obtained from the item embedding dictionary may be aligned based on item-item interaction information obtained from the data structure or matrix. The method 1300 may further generate an item embedding representing a ground-truth next click image at 1310.

At 1312, the query item embedding and the search history item embedding may be combined to generate a weighted item embedding. Further, the previously generated user embedding may be combined with the weighted item embedding to generate the personalized item embedding at 1314. At 1316, a loss, such as a contrastive loss, may be generated between the personalized item embedding and the item embedding generated for the ground-truth next click at 1310. Accordingly, one or more models may be adjusted based on the calculated loss. The method 1300 may then end at 1318.

Figure 14:
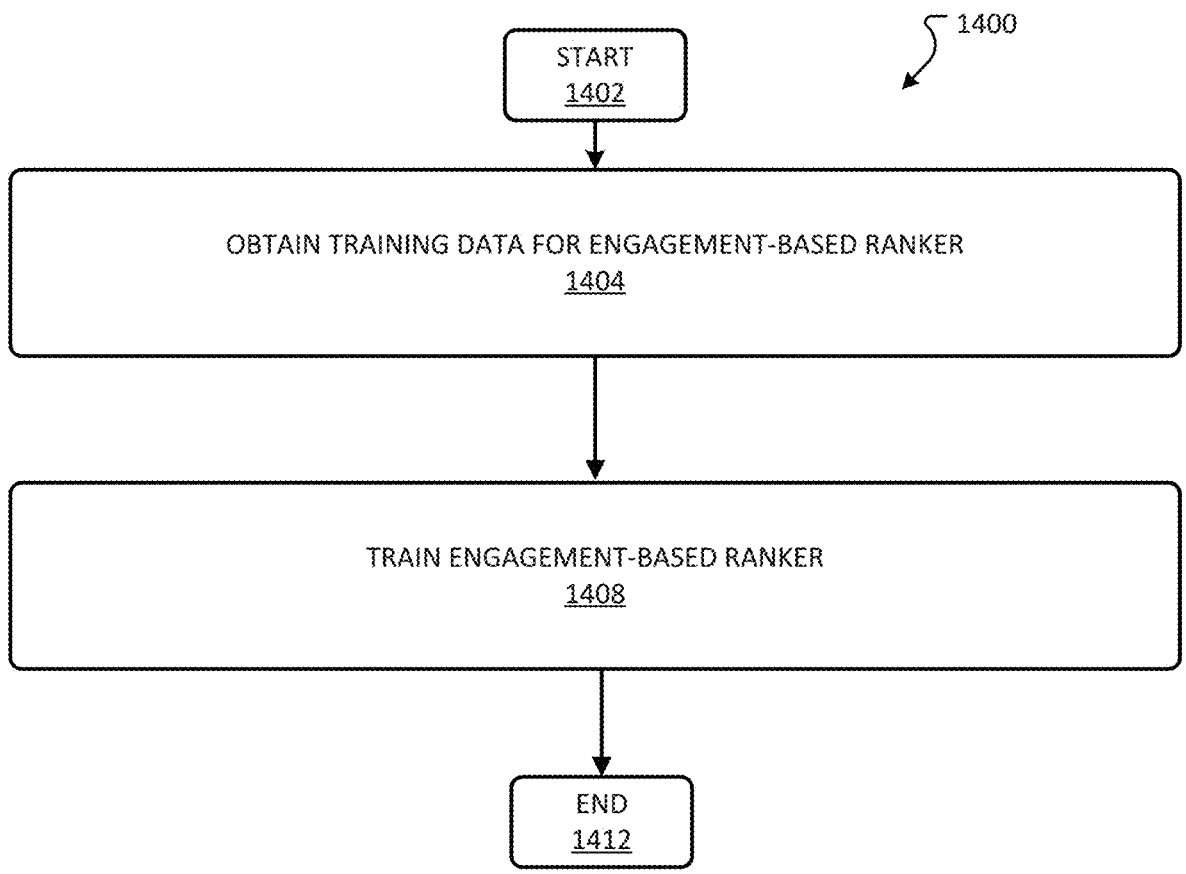
FIG. 14 depicts details of an example method for training an engagement-based ranking model in accordance with examples of the present disclosure.

FIG. 14 depicts details of an example method 1400 for training an engagement-based ranking model in accordance with examples of the present disclosure. A general order for the steps of the method 1400 is shown in FIG. 14. Generally, the method 1400 starts at 1402 and ends at 1412. The method 1400 may include more or fewer steps or may arrange the order of the steps differently than those shown in FIG. 14. The method 1400 can be executed as a set of computer-executable instructions executed by a computer system and encoded or stored on a computer-readable medium. Further, the method 1400 can be performed by gates or circuits associated with a processor, Application Specific Integrated Circuit (ASIC), a field-programmable gate array (FPGA), a system on chip (SOC), graphics processing unit (GPU), or other hardware device. Hereinafter, the method 1400 shall be explained with reference to the systems, components, modules, software, data structures, user interfaces, etc. described in conjunction with FIGS. 1-13.

The method 1400 begins at operation 1402 and proceeds to 1404. In examples, the engagement-based ranker may include a transformer-based neural network model and be trained on user information including user click logs and user attributes. Accordingly, at 1404, user click logs and user attributes may be received from a computing device for example. The user attributes may include information obtained from or otherwise based on the user profile and other user-based attributes. For example, a user profile and user-based attributes may provide information about a user that includes, but is not limited to language, gender, age, location, etc. In addition, a user click log may indicate a measure of user engagement with one or more images selected, or clicked, by a user. In some examples, additional information, such as content-based features extracted from the images in the user click log may be provided to the engagement-based ranker as training data.

Alternatively, or in addition, the user click log may include query specific, session specific, and/or content specific items. Thus, the neural network model of the engagement-based ranker may be trained at 1408 based on the user attributes to predict an indication of user engagement with clicked or selected content. Alternatively, or in addition, the neural network model of the engagement-based ranker may be trained at 1408 using the user attributes, using a ground-truth next-click image from the user click log to predict an indication of user engagement based on previously clicked images and/or in response to a query image. The method 1400 may end at 1412.

Figure 15:
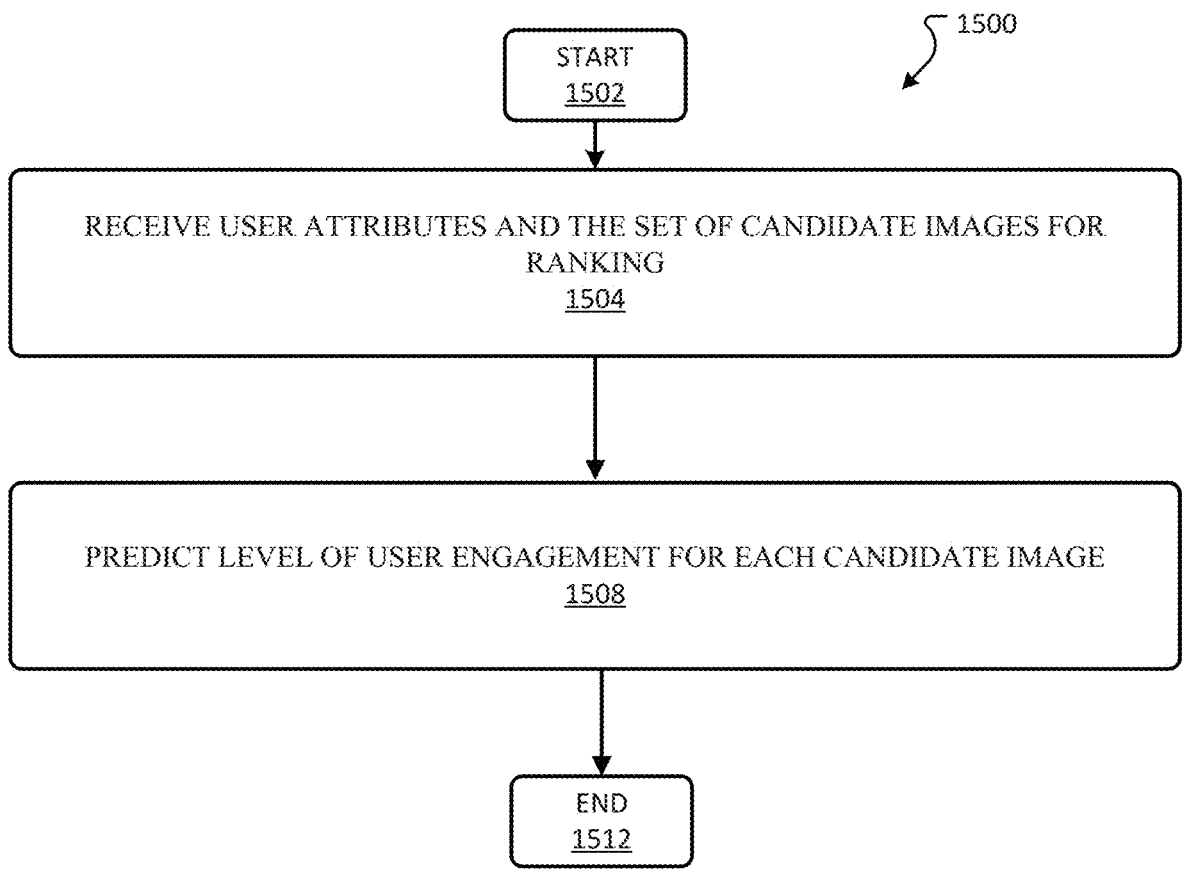
FIG. 15 depicts details of an example method ranking a set of candidate images based on user engagement using a trained engagement-based ranking model in accordance with examples of the present disclosure.

FIG. 15 depicts details of an example method 1500 ranking a set of candidate images based on user engagement using a trained engagement-based ranking model in accordance with examples of the present disclosure. A general order for the steps of the method 1500 is shown in FIG. 15. Generally, the method 1500 starts at 1502 and ends at 1512. The method 1500 may include more or fewer steps or may arrange the order of the steps differently than those shown in FIG. 15. The method 1500 can be executed as a set of computer-executable instructions executed by a computer system and encoded or stored on a computer-readable medium. Further, the method 1500 can be performed by gates or circuits associated with a processor, Application Specific Integrated Circuit (ASIC), a field-programmable gate array (FPGA), a system on chip (SOC), graphics processing unit (GPU), or other hardware device. Hereinafter, the method 1500 shall be explained with reference to the systems, components, modules, software, data structures, user interfaces, etc. described in conjunction with FIGS. 1-14.

The method 1500 begins at operation 1502 and proceeds to 1504. In examples, the engagement-based ranker may include a transformer-based neural network model trained on user information including user click logs and user attributes and is configured to output a set of candidate images/embeddings based on a predicted level of user engagement. Accordingly, at 1504, the engagement-based ranker may receive user attributes and the set of candidate images for ranking. At 1508, a predicted level of user engagement may be generated for each image/embedding in the received set of images/embeddings. In examples, the set of candidate images may therefore be ranked based on user attributes, such as location, age, gender, and content-based features, such as Deep Neural Network (DNN) embeddings, dominant colors, dominant objects, etc. The method 1500 may end at 1512.

Figure 16:
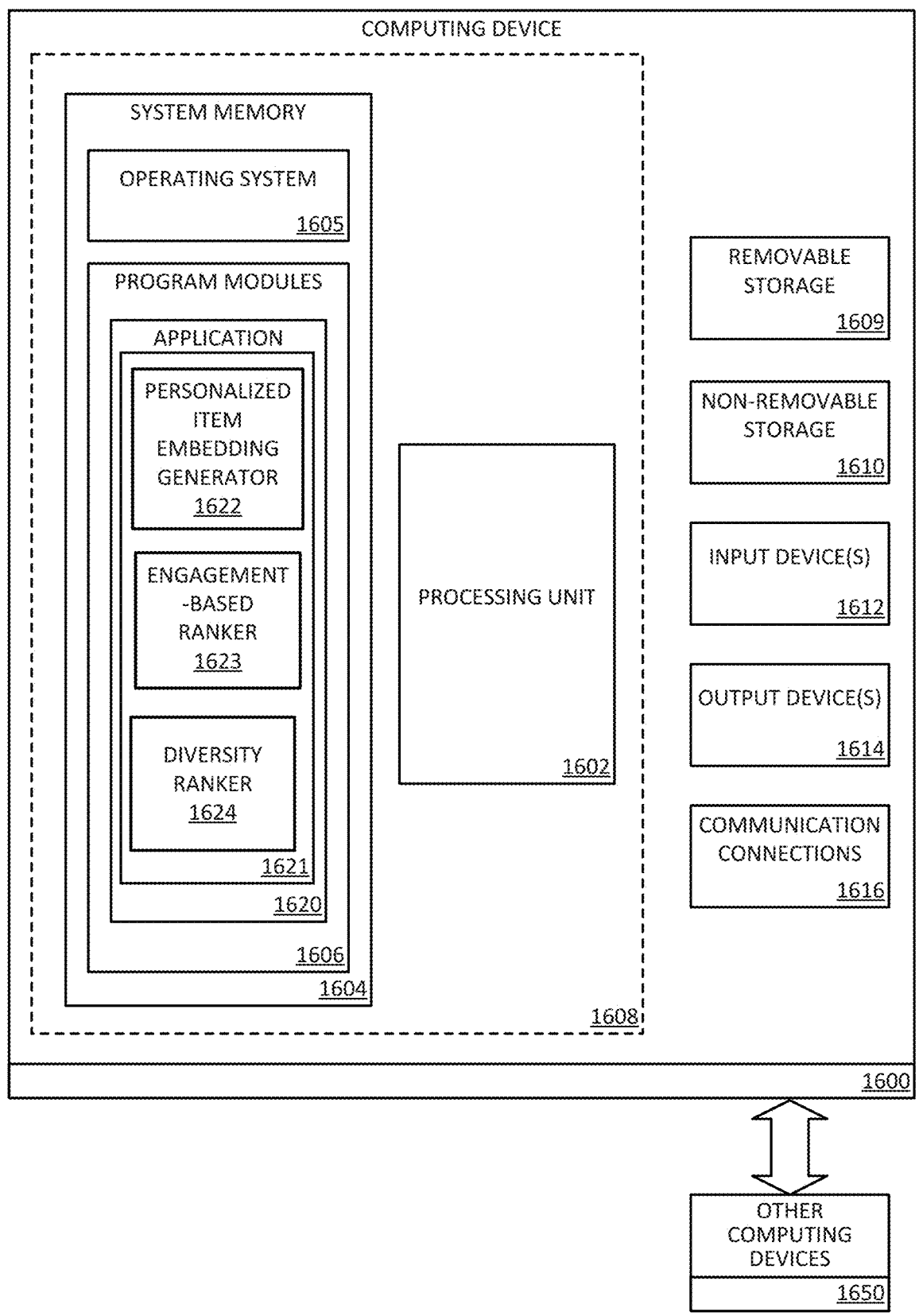
FIG. 16 depicts a block diagram illustrating physical components (e.g., hardware) of a computing device with which aspects of the disclosure may be practiced.

FIG. 16 is a block diagram illustrating physical components (e.g., hardware) of a computing device 1600 with which aspects of the disclosure may be practiced. The computing device components described below may be suitable for the computing devices and/or systems described above. For example, the computing device 1600 may represent a portion of the web-scale personalized visual search system 106, the web-scale personalized visual search system 200, and/or the computing device 202. In a basic configuration, the computing device 1600 may include at least one processing unit 1602 and a system memory 1604. Depending on the configuration and type of computing device, the system memory 1604 may comprise, but is not limited to, volatile storage (e.g., random access memory), non-volatile storage (e.g., read-only memory), flash memory, or any combination of such memories.

The system memory 1604 may include an operating system 1605 and one or more program modules 1606 suitable for performing the various aspects disclosed herein such. The operating system 1605, for example, may be suitable for controlling the operation of the computing device 1600. Furthermore, aspects of the disclosure may be practiced in conjunction with a graphics library, other operating systems, or any other application program and is not limited to any particular application or system. This basic configuration is illustrated in FIG. 16 by those components within a dashed line 1608. The computing device 1600 may have additional features or functionality. For example, the computing device 1600 may also include additional data storage devices (removable and/or non-removable) such as, for example, magnetic disks, optical disks, or tape. Such additional storage is illustrated in FIG. 16 by a removable storage device 1609 and a non-removable storage device 1610.

As stated above, several program modules and data files may be stored in the system memory 1604. While executing on the at least one processing unit 1602, the application 1607 or the program modules 1606 may perform processes including, but not limited to, one or more aspects, as described herein. The application 1620 includes, for example, a personalized item embedding generator 1622, an engagement-based ranker 1623, and a diversity ranker 1624, in accordance with the description provided herein. Further, the application 1620 may include a web-scale personalized visual search system 1621. Other program modules that may be used in accordance with aspects of the present disclosure may include electronic mail and contacts applications, word processing applications, spreadsheet applications, database applications, slide presentation applications, drawing or computer-aided application programs, etc., and/or one or more components supported by the systems described herein.

Furthermore, aspects of the disclosure may be practiced in an electrical circuit comprising discrete electronic elements, packaged or integrated electronic chips containing logic gates, a circuit utilizing a microprocessor, or on a single chip containing electronic elements or microprocessors. For example, aspects of the disclosure may be practiced via a system-on-a-chip (SOC) where each or many of the components illustrated in FIG. 5 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 1600 on the single integrated circuit (chip). Aspects of the disclosure may also be practiced using other technologies capable of performing logical operations such as, for example, AND, OR, and NOT, including but not limited to mechanical, optical, fluidic, and quantum technologies. In addition, aspects of the disclosure may be practiced within a general-purpose computer or in any other circuits or systems.

The computing device 1600 may also have one or more input device(s) 1612 such as a keyboard, a mouse, a pen, a sound or voice input device, a touch or swipe input device, etc. The output device(s) 1614 such as a display, speakers, a printer, etc. may also be included. The aforementioned devices are examples and others may be used. The computing device 1600 may include one or more communication connections 1616 allowing communications with other computing devices 1650. Examples of suitable communication connections 1616 include, but are not limited to, radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 1604, the removable storage device 1609, and the non-removable storage device 1610 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 1600. Any such computer storage media may be part of the computing device 1600. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 17:
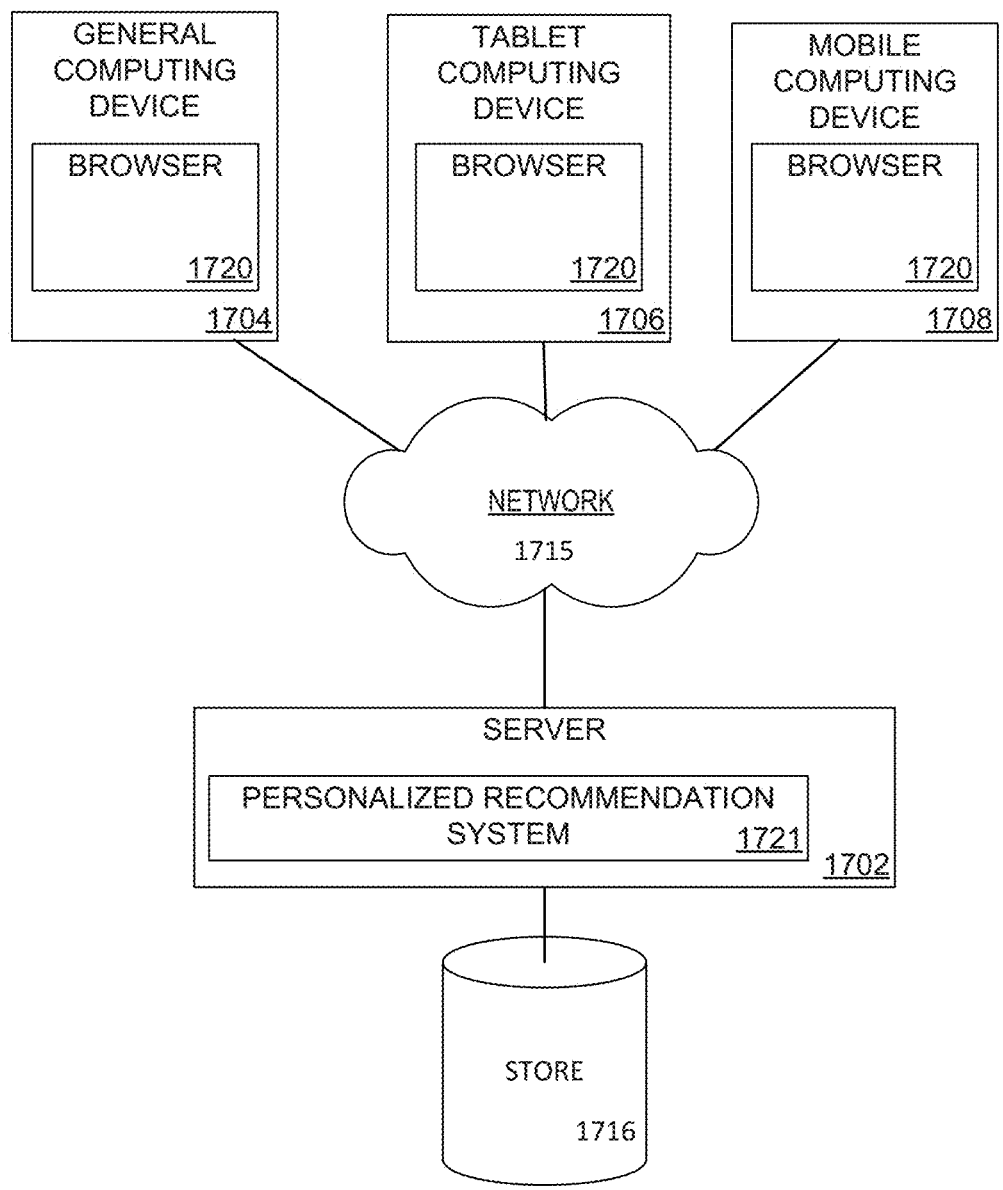
FIG. 17 depicts one aspect of the architecture of a system for processing data received at a computing system, suitable for performing various aspects disclosed herein.

FIG. 17 illustrates one aspect of the architecture of a system for processing data received at a computing system, suitable for performing the various aspects disclosed herein, from a remote source, such as a personal computer 1704, tablet computing device 1706, or mobile computing device 1708, as described above. Content displayed at server device 1702 may be stored in different communication channels or other storage types. For example, the computing device 1704, 1706, 1708 may represent the computing device 202 of FIG. 2, and the server device 1702 may represent a computing device, such as the web-scale personalized search system 106 and 200.

In some aspects, one or more of a personalized item embedding generator 1622, an engagement-based ranker 1623, and a diversity ranker 1624, and/or a web-scale personalized visual search system 1721 may be employed by server device 1702. The server device 1702 may provide data to and from a client computing device such as a personal computer 1704, a tablet computing device 1706 and/or a mobile computing device 1708 (e.g., a smart phone) through a network 1715. By way of example, the computer system described above may be embodied in a personal computer 1704, a tablet computing device 1706 and/or a mobile computing device 1708 (e.g., a smart phone). Any of these aspects of the computing devices may obtain content from the store 1716, in addition to receiving graphical data useable to be either pre-processed at a graphic-originating system, or post-processed at a receiving computing system. The content store 1716 may include an image ANN table, such as the image ANN table 214, as previously described herein.

FIG. 17 illustrates an exemplary mobile computing device 1708 that may execute one or more aspects disclosed herein. In addition, the aspects and functionalities described herein may operate over distributed systems (e.g., cloud-based computing systems), where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example, user interfaces and information of various types may be displayed and interacted with on a wall surface onto which user interfaces and information of various types are projected. Interaction with the multitude of computing systems with which aspects of the invention may be practiced include, keystroke entry, touch screen entry, voice or other audio entry, gesture entry where an associated computing device is equipped with detection (e.g., camera and/or microphone) functionality for capturing and interpreting user gestures for controlling the functionality of the computing device, and the like.

The phrases "at least one," "one or more," "or," and "and/or" are open-ended expressions that are both conjunctive and disjunctive in operation. For example, each of the expressions "at least one of A, B and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B and C together.

The term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

Any of the steps, functions, and operations discussed herein can be performed continuously and automatically.

The exemplary systems and methods of this disclosure have been described in relation to computing devices. However, to avoid unnecessarily obscuring the present disclosure, the preceding description omits several known structures and devices. This omission is not to be construed as a limitation. Specific details are set forth to provide an understanding of the present disclosure. It should, however, be appreciated that the present disclosure may be practiced in a variety of ways beyond the specific detail set forth herein.

Furthermore, while the exemplary aspects illustrated herein show the various components of the system collocated, certain components of the system can be located remotely, at distant portions of a distributed network, such as a LAN and/or the Internet, or within a dedicated system. Thus, it should be appreciated, that the components of the system can be combined into one or more devices, such as a server, communication device, or collocated on a particular node of a distributed network, such as an analog and/or digital telecommunications network, a packet-switched network, or a circuit-switched network. It will be appreciated from the preceding description, and for reasons of computational efficiency, that the components of the system can be arranged at any location within a distributed network of components without affecting the operation of the system.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire, and fiber optics, and may take the form of acoustic or light waves, such as those generated during radio-wave and infra-red data communications.

While the flowcharts have been discussed and illustrated in relation to a particular sequence of events, it should be appreciated that changes, additions, and omissions to this sequence can occur without materially affecting the operation of the disclosed configurations and aspects.

Several variations and modifications of the disclosure can be used. It would be possible to provide for some features of the disclosure without providing others.

In yet another configurations, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the present disclosure includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another configuration, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another configuration, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as a program embedded on a personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

The disclosure is not limited to standards and protocols if described. Other similar standards and protocols not mentioned herein are in existence and are included in the present disclosure. Moreover, the standards and protocols mentioned herein, and other similar standards and protocols not mentioned herein are periodically superseded by faster or more effective equivalents having essentially the same functions. Such replacement standards and protocols having the same functions are considered equivalents included in the present disclosure.

The present disclosure, in various configurations and aspects, includes components, methods, processes, systems and/or apparatus substantially as depicted and described herein, including various combinations, subcombinations, and subsets thereof. Those of skill in the art will understand how to make and use the systems and methods disclosed herein after understanding the present disclosure. The present disclosure, in various configurations and aspects, includes providing devices and processes in the absence of items not depicted and/or described herein or in various configurations or aspects hereof, including in the absence of such items as may have been used in previous devices or processes, e.g., for improving performance, achieving ease, and/or reducing cost of implementation.

The present disclosure relates to systems and methods for returning personalized image-based search results.

(A1) In one aspect, some examples include a method for returning personalized image-based search results. The method may include: receiving a query including an image, generating a personalized item embedding based on the image and user profile information associated with a user, obtaining a plurality of candidate images based on the personalized item embedding, ranking the plurality of candidate images according to a predicted level of user engagement for the user, diversifying the ranked plurality of candidate images and obtaining a final set of candidate images and returning a portion of the final set of candidate images.

(A2) In some examples of A1 above, generating the personalized item embedding comprises: receiving search history information associated with the user, the search history information identifying at least one image previously selected by the user, generating a query item embedding based on the image, generating an item embedding for the at least one image previously selected by the user, and generating a weighted item embedding as a combination of the query item embedding and the item embedding for the at least one image previously selected by the user.

(A3) In some examples of A1-A2 above, generating the personalized item embedding further comprises generating a user embedding from a neural network model and the user embedding is based on user meta data specific to the user, and generating the personalized item embedding by combing the user embedding with the weighted item embedding.

(A4) In some examples of A1-A3 above, the user metadata includes at least one of an age associated with the user, a location of the user, and a gender of the user.

(A5) In some examples of A1-A4 above, the query item embedding and the item embedding for the at least one image previously selected by the user are obtained from an item embedding dictionary.

(A6) In some examples of A1-A5 above, the method further includes: receiving a second query including the same image; generating a second personalized item embedding based on the image and user profile information associated with a second user; obtaining a second plurality of candidate images based on the second personalized item embedding, wherein the second plurality of candidate images are different form the plurality of candidate images ranking the second plurality of candidate images according to a predicted level of user engagement for the second user; diversifying the ranked second plurality of candidate images and obtaining a second final set of candidate images; and returning a portion of the second final set of candidate images.

(A7) In some examples of A1-A6 above, generating the personalized item embedding comprises: receiving search history information associated with the user, the search history information identifying a plurality of images previously selected by the user, generating a query item embedding based on the image, generating a plurality of item embeddings for the plurality of images previously selected by the user, and generating a weighted item embedding as a combination of the query item embedding and the plurality of item embeddings for the plurality of images previously selected by the user.

(A8) In some examples of A1-A7 above, generating the personalized item embedding further comprises generating a first user embedding from a user embedding dictionary, generating a second user embedding from a neural network model and the second user embedding is based on user meta data specific to the user and the first user embedding, and generating the personalized item embedding by combing the second user embedding with the weighted item embedding.

In yet another aspect, some examples include a computing system including one or more processors and memory coupled to the one or more processors, the memory storing one or more instructions which when executed by the one or more processors, causes the one or more processors perform any of the methods described herein (e.g., A1-A8 described above).

In yet another aspect, some examples include a non-transitory computer-readable storage medium storing one or more programs for execution by one or more processors of a storage device, the one or more programs including instructions for performing any of the methods described herein (e.g., A1-A8 described above).

(B1) In one aspect, some examples include a method for returning personalized image-based search results. The method may include: receiving, as a first request, a first query including an image, generating a first personalized item embedding based on the image and user profile information associated with the first request, obtaining a first plurality of candidate images based on the first personalized item embedding, returning a portion of the first plurality of candidate images to a computing device associated with the first request, receiving, as a second request, a second query including the same image, generating a second personalized item embedding based on the same image and user profile information associated with the second request, obtaining a second plurality of candidate images based on the second personalized item embedding and returning a portion of the second plurality of candidate images to a computing device associated with the second request.

(B2) In some examples of B1 above, generating the first personalized item embedding comprises: generating a first item embedding based on the image and user profile information associated with the first request, generating a second item embedding based on the image and user profile information associated with the second request, generating a first user embedding from a first neural network model specific to a first user associated with the first request, the first user embedding is based on user meta data specific to the first user associated with the first request, generating a second user embedding from a second neural network model specific to the second a second user associated with the second request and the second user embedding is based on user meta data specific to the second user associated with the second request, generating the first personalized item embedding by combing the first user embedding with the first item embedding, generating the second personalized item embedding by combing the second user embedding with the second item embedding, obtaining the first plurality of candidate images based on the first personalized item embedding from an visual search index, and obtaining the second plurality of candidate images based on the second personalized item embedding from the same visual search index.

(B3) In some examples of B1-B2 above, each image of the portion of the first plurality of candidate images returned to the computing device associated with the first request are ranked according to a predicted level of user engagement specific to a first user associated with the first request.

(B4) In some examples of B1-B3 above, the portion of the first plurality of candidate images returned to the computing device associated with the first request are diversified according to a distance between each image of the first plurality of candidate images based on a feature vector.

(B5) In some examples of B1-B4 above, the user profile information associated with the first request includes at least one of an age associated with a user, a location of a user, and a gender of a user.

(B6) Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

In yet another aspect, some examples include a computing system including one or more processors and memory coupled to the one or more processors, the memory storing one or more instructions which when executed by the one or more processors, causes the one or more processors perform any of the methods described herein (e.g., B1-B6 described above).

In yet another aspect, some examples include a non-transitory computer-readable storage medium storing one or more programs for execution by one or more processors of a storage device, the one or more programs including instructions for performing any of the methods described herein (e.g., B1-B6 described above).

(C1) In one aspect, some examples include a method for ranking images in an image set based on a predicted level of user engagement. The method may include receiving a set of candidate images, for each image in the set of candidate images, predicting a user engagement score indicating a likelihood a user will click the respective image in the set of candidate images and storing an engagement-based ranked set of candidate images based on the engagement score predicted for each respective image.

(C2) In some examples of C1 above, the method further includes periodically retraining the machine learning model using updated user log information, wherein the updated user log information provides an indication of items previously selected by the user.

(C3) In some examples of C1-C2 above, the machine learning model is a transformer-based neural network model.

(C4) In some examples of C1-C3 above, the method further includes filtering the engagement-based ranked set of candidate images based on the engagement score predicted for each respective image exceeding a predetermined value; and storing the filtered set of candidate images as the engagement-based ranked set of candidate images.

(C5) In some examples of C1-C4 above, the user attributes include at least one of user location, user age, and user gender.

(C6) In some examples of C1-C5 above, the set of candidate images are processed in a single batch such that the predicted user engagement score for each image is relative to another image in the single batch.

In yet another aspect, some examples include a computing system including one or more processors and memory coupled to the one or more processors, the memory storing one or more instructions which when executed by the one or more processors, causes the one or more processors perform any of the methods described herein (e.g., C1-C6 described above).

In yet another aspect, some examples include a non-transitory computer-readable storage medium storing one or more programs for execution by one or more processors of a storage device, the one or more programs including instructions for performing any of the methods described herein (e.g., C1-C6 described above).

(D1) In one aspect, some examples include a method for ranking images in an image set based on a visual diversity of each image with respect to other images in the image set. The method may include receiving a set of candidate images, generating a distance score as a measure of dissimilarity for each image in the set of candidate images, selecting a subset of images from the set of candidate images based on a distance score of each image and storing, as a diversity ranked set of candidate images, the subset of images.

(D2) In some examples of D1 above, the distance score is generated from a content-based feature specific to one or more images.

(D3) In some examples of D1-D2 above, the subset of images is selected using a determinantal point process algorithm.

(D4) In some examples of D1-D3 above, the set of candidate images include images ranked according to a predicted level of user engagement.

In yet another aspect, some examples include a computing system including one or more processors and memory coupled to the one or more processors, the memory storing one or more instructions which when executed by the one or more processors, causes the one or more processors perform any of the methods described herein (e.g., D1-D4 described above).

In yet another aspect, some examples include a non-transitory computer-readable storage medium storing one or more programs for execution by one or more processors of a storage device, the one or more programs including instructions for performing any of the methods described herein (e.g., D1-D4 described above).

(E1) In one aspect, some examples include a method for generating data for optimizing an item embedding generation process and generating an item embedding based on the data. The method may include receiving a plurality of user logs indicating items selected in response to one or more queries, for each query of the one or more queries, grouping the items selected based on a session duration, generating item-item pairs from the selected items that being grouped within the same session, populating an item interaction matrix based on the generated item-item pairs and generating an item embedding for a received item based on the interaction matrix.

(E2) In some examples of E1 above, the method further includes aggregating item-item pairs across the plurality of user logs; for each item-item pair included in the item interaction matrix, assigning a weight to the item-item pair based on a number of occurrences of the item-item pair, wherein the weight assigned to the item-item pair modifies an item embedding generated for the received item.

(E3) In some examples of E1-E2 above, the items are images.

(E4) In some examples of E1-E3 above, the method further includes removing item-item pairs when a calculated visual difference between each image of the item-item pair is greater than a predetermined value.

(E5) In some examples of E1-E4 above, a Bayesian Personalized Ranking algorithm is used to generate the item embedding for the received item.

(E6) In some examples of E1-E5 above, the method further includes aggregating item-item pairs across the plurality of user logs; and adding the item-item pair to the interaction matrix when a number of occurrences of the item-item pair occurring in the plurality of user logs exceeds a predetermined value.

In yet another aspect, some examples include a computing system including one or more processors and memory coupled to the one or more processors, the memory storing one or more instructions which when executed by the one or more processors, causes the one or more processors perform any of the methods described herein (e.g., E1-E6 described above).

In yet another aspect, some examples include a non-transitory computer-readable storage medium storing one or more programs for execution by one or more processors of a storage device, the one or more programs including instructions for performing any of the methods described herein (e.g., E1-E6 described above).

(F1) In one aspect, some examples include a method for obtaining training data for training a machine learning model to generate a user embedding for a user. The method may include identifying the item of the one or more items as a query item, identifying one or more items occurring before the query item as historical items, and identifying an item occurring after the query item as a ground-truth next click item, generating a list of contexts specific to the user associated with the user log and training a user specific machine learning model using the list of contexts.

(F2) In some examples of F1 above, generating the list of contexts specific to the user associated with the user log includes iterating through the user log item by item and a previously identified ground-truth next click item becomes the query item, and the previously identified query item becomes a historical item.

(F3) In some examples of F1-F2 above, the method further includes periodically retraining the user specific machine learning model using an updated list of contexts.

(F4) In some examples of F1-F3 above, the method further includes training the user specific machine learning model using the list of contexts and user attributes associated with a user.

(F5) In some examples of F1-F4 above, the user attributes include at least one of location, age, and gender associated with the user.

(F6) In some examples of F1-F5 above, the method further includes receiving recent search history for the user; generating a user embedding for the user based on the received recent search history, wherein the user embedding is generated using the user specific machine learning model.

In yet another aspect, some examples include a computing system including one or more processors and memory coupled to the one or more processors, the memory storing one or more instructions which when executed by the one or more processors, causes the one or more processors perform any of the methods described herein (e.g., F1-F6 described above).

In yet another aspect, some examples include a non-transitory computer-readable storage medium storing one or more programs for execution by one or more processors of a storage device, the one or more programs including instructions for performing any of the methods described herein (e.g., F1-F6 described above).

(G1) In one aspect, some examples include a method for generating a user embedding for a user. The method may include receiving recent search history for the user and generating a user embedding for the user based on the received recent search history, wherein the user embedding is generated using a user specific machine learning model trained with training data specific to the user, wherein the training data includes a list of contexts obtained from a user log indicating items selected by the user in response to one or more queries.

(G2) In some examples of G1 above, the method further includes: for one or more items in the user log: identifying the item of the one or more items as a query item, identifying one or more items occurring before the query item as historical items, and identifying an item occurring after the query item as a ground-truth next click item; and generating the list of contexts specific to the user associated with the user log, wherein each context includes a query, one or more historical items, and a ground-truth item.

(G3) In some examples of G1-G2 above, the method further includes iterating through the user log item by item, wherein a previously identified ground-truth next click item becomes the query item, and the previously identified query item becomes a historical item.

In yet another aspect, some examples include a computing system including one or more processors and memory coupled to the one or more processors, the memory storing one or more instructions which when executed by the one or more processors, causes the one or more processors perform any of the methods described herein (e.g., G1-G3 described above).

In yet another aspect, some examples include a non-transitory computer-readable storage medium storing one or more programs for execution by one or more processors of a storage device, the one or more programs including instructions for performing any of the methods described herein (e.g., G1-G3 described above).

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

What is claimed is:

1. A method for returning personalized image-based search results, the method comprising:
    receiving a query including an image;
    generating a personalized item embedding based on the image and user profile information associated with a user;
    obtaining a plurality of candidate images based on the personalized item embedding;
    ranking the plurality of candidate images according to a predicted level of user engagement for the user;
    obtaining a diversified final set of image results from the ranked plurality of candidate images utilizing a feature vector related to content-based features associated with the ranked plurality of candidate images to increase a distance between images in the final set of image results such that the final set of image results have increased visual differences between images in the final set of images results;

returning the final set of image results;

receiving a second query including the same image;

generating a second personalized item embedding based on the image and user profile information associated with a second user;

obtaining a second plurality of candidate images based on the second personalized item embedding, wherein the second plurality of candidate images are different from the plurality of candidate images;

ranking the second plurality of candidate images according to a predicted level of user engagement for the second user;

obtaining a diversified second final set of image results from the second ranked plurality of candidate images utilizing a feature vector related to content-based features associated with the second ranked plurality of candidate images to increase a distance between images in the second final set of image results such that the second final set of image results have increased visual differences between images in the second final set; and returning a portion of the second final set of image results.

2. The method of claim 1, wherein generating the personalized item embedding comprises:

receiving search history information associated with the user, the search history information identifying at least one image previously selected by the user;

generating a query item embedding based on the image;

generating an item embedding for the at least one image previously selected by the user; and generating a weighted item embedding as a combination of the query item embedding and the item embedding for the at least one image previously selected by the user.

3. The method of claim 2, wherein generating the personalized item embedding further comprises:

generating a user embedding from a neural network model, wherein the user embedding is based on user meta data specific to the user; and generating the personalized item embedding by combining the user embedding with the weighted item embedding.

4. The method of claim 3, wherein the user metadata includes at least one of an age associated with the user, a location of the user, and a gender of the user.

5. The method of claim 3, wherein the query item embedding and the item embedding for the at least one image previously selected by the user are obtained from an item embedding dictionary.

6. The method of claim 1, wherein generating the personalized item embedding comprises:

receiving search history information associated with the user, the search history information identifying a plurality of images previously selected by the user;

generating a query item embedding based on the image;

generating a plurality of item embeddings for the plurality of images previously selected by the user; and generating a weighted item embedding as a combination of the query item embedding and the plurality of item embeddings for the plurality of images previously selected by the user.

7. The method of claim 6, wherein generating the personalized item embedding further comprises:

generating a first user embedding from a user embedding dictionary;

generating a second user embedding from a neural network model, wherein the second user embedding is based on user meta data specific to the user and the first user embedding; and generating the personalized item embedding by combining the second user embedding with the weighted item embedding.

8. A method for returning personalized image-based search results, the method comprising:

receiving, as a first request, a first query including an image;

generating a first personalized item embedding based on the image and user profile information associated with the first request;

obtaining a first plurality of candidate images based on the first personalized item embedding;

ranking the first plurality of candidate images according to a predicted level of user engagement for the user associated with the first request;

obtaining a diversified first final set of image results from the ranked first plurality of candidate images utilizing a feature vector related to content-based features associated with the ranked first plurality of candidate images to increase a distance between images in the first final set of image results such that the first final set of image results have reduced similarity between images in the first final set of image results;

returning a portion of the first final set of image results to a computing device associated with the first request;

receiving, as a second request, a second query including the same image;

generating a second personalized item embedding based on the same image and user profile information associated with the second request;

obtaining a second plurality of candidate images based on the second personalized item embedding, wherein the second plurality of candidate images are different from the first plurality of candidate images;

ranking the second plurality of candidate images according to a predicted level of user engagement for the user associated with the second request;

obtaining a diversified second final set of image results from the ranked second plurality of candidate images utilizing a feature vector related to content-based features associated with the ranked second plurality of candidate images to increase a distance between images in the second final set of image results such that the second final set of image results have increased visual differences between images in the second final set of image results; and returning a portion of the second final set of image results to a computing device associated with the second request.

9. The method of claim 8, wherein generating the first personalized item embedding comprises:

generating a first item embedding based on the image and user profile information associated with the first request;

generating a second item embedding based on the image and user profile information associated with the second request;

generating a first user embedding from a first neural network model specific to a first user associated with the first request, wherein the first user embedding is based on user meta data specific to the first user associated with the first request;

generating a second user embedding from a second neural network model specific to the second a second user associated with the second request, wherein the second user embedding is based on user meta data specific to the second user associated with the second request;

generating the first personalized item embedding by combining the first user embedding with the first item embedding;

generating the second personalized item embedding by combining the second user embedding with the second item embedding;

obtaining the first plurality of candidate images based on the first personalized item embedding from an visual search index; and obtaining the second plurality of candidate images based on the second personalized item embedding from the same visual search index.

10. The method of claim 8, wherein each image of the first final set of image results returned to the computing device associated with the first request are ranked according to a predicted level of user engagement specific to a first user associated with the first request.

11. The method of claim 8, wherein the first final set of image results have reduced similarity between the images in the set.

12. The method of claim 8, wherein the user profile information associated with the first request includes at least one of an age associated with a user, a location of a user, and a gender of a user.

13. A system for returning personalized image-based search results, the system comprising one or more hardware processors configured by machine-readable instructions to:
receive a query including an image;
generate a personalized item embedding based on the image and user profile information associated with a user;
obtain a plurality of candidate images based on the personalized item embedding;
rank the plurality of candidate images according to a predicted level of user engagement for the user;
obtain a diversified final set of image results from the ranked plurality of candidate images utilizing a feature vector related to content-based features associated with the ranked plurality of candidate images to increase a distance between images in the final set of image results such that the final set of image results have increased visual differences between images in the final set of images results; and
return a portion of the final set of image results;
receive a second query including the same image;
generate a second personalized item embedding based on the image and user profile information associated with a second user;
obtain a second plurality of candidate images based on the second personalized item embedding, wherein the second plurality of candidate images are different form the plurality of candidate images;
rank the second plurality of candidate images according to a predicted level of user engagement for the second user;
obtain a diversified second final set of image results from the second ranked plurality of candidate images utilizing a feature vector related to content-based features associated with the second ranked plurality of candidate images to increase a distance between images in the second final set of image results such that the second final set of image results have increased visual differences between images in the second final set of image results; and
return a portion of the second final set of image results.

14. The system of claim 13, wherein the one or more hardware processors are further configured by machine-readable instructions to:
receive search history information associated with the user, the search history information identifying at least one image previously selected by the user;
generate a query item embedding based on the image;
generate an item embedding for the at least one image previously selected by the user; and
generate a weighted item embedding as a combination of the query item embedding and the item embedding for the at least one image previously selected by the user.

15. The system of claim 14, wherein the one or more hardware processors are further configured by machine-readable instructions to:
generate a user embedding from a neural network model, wherein the user embedding is based on user meta data specific to the user; and
generate the personalized item embedding by combining the user embedding with the weighted item embedding.

16. The system of claim 15, wherein the user metadata includes at least one of an age associated with the user, a location of the user, and a gender of the user.

17. The system of claim 15, wherein the query item embedding and the item embedding for the at least one image previously selected by the user are obtained from an item embedding dictionary.

18. The system of claim 13, wherein the one or more hardware processors are further configured by machine-readable instructions to:
receive search history information associated with the user, the search history information identifying a plurality of images previously selected by the user;
generate a query item embedding based on the image;
generate a plurality of item embeddings for the plurality of images previously selected by the user; and
generate a weighted item embedding as a combination of the query item embedding and the plurality of item embeddings for the plurality of images previously selected by the user.

* * * * *